US012691692B2

(12) United States Patent

Tsukagoshi

(10) Patent No.: US 12,691,692 B2

(45) Date of Patent: Jul. 28, 2026

(54) TAPE PRINTING APPARATUS, METHOD FOR CONTROLLING TAPE PRINTING APPARATUS, INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Shinichi Tsukagoshi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/087,786

(22) Filed: Mar. 24, 2025

(65) Prior Publication Data

US 2025/0296352 A1 Sep. 25, 2025

(30) Foreign Application Priority Data

Mar. 25, 2024 (JP) ................................. 2024-048444

(51) Int. Cl.
*B41J 3/407* (2006.01)
*B41J 3/46* (2006.01)
*G06F 40/106* (2020.01)

(52) U.S. Cl.
CPC ............... *B41J 3/4075* (2013.01); *B41J 3/46* (2013.01); *G06F 40/106* (2020.01)

(58) Field of Classification Search
CPC .......... B41J 3/4075; B41J 3/46; G06F 40/106
See application file for complete search history.

(56) References Cited

U.S. PATENT DOCUMENTS 5,496,117 A * 3/1996 Sawada .................... G06K 1/12
400/586
5,704,722 A 1/1998 Kanou
(Continued)

FOREIGN PATENT DOCUMENTS

EP 0768611 A2 * 4/1997 ................ B41J 3/46
JP H09-076575 A 3/1997
(Continued)

OTHER PUBLICATIONS

"MP300 Printer Operator's Manual", Panduit Corp., 2019.

*Primary Examiner* — Christle I Marshall
(74) *Attorney, Agent, or Firm* — Oliff PLC

(57) ABSTRACT

A tape printing apparatus includes a display section and a controller that controls the display section such that a text screen on which a text to be edited, a sequential number character string input screen, and a non-sequential number character string input screen are displayed. The controller receives an input of a sequential number character string in a state where the sequential number character string input screen is displayed, receives an input of a first non-sequential number character string and an input of a second non-sequential number character string in a state where the non-sequential number character string input screen is displayed, controls the display section such that a sequential number update character string obtained by updating the sequential number character string, the first non-sequential number character string, and the second non-sequential number character string are displayed in each of a plurality of paragraphs provided on the text screen.

11 Claims, 19 Drawing Sheets

(56)         References Cited

U.S. PATENT DOCUMENTS

| | | | | |
|---|---|---|---|---|
| 8,714,847 | B2 * | 5/2014 | Tsuji ...................... | B41J 3/4075 |
| | | | | 400/62 |
| 8,934,128 | B2 * | 1/2015 | Kajihara ................ | G06K 15/02 |
| | | | | 358/468 |
| 10,232,656 | B2 * | 3/2019 | Nakagawa ............ | G06F 3/1253 |
| 2003/0110441 | A1 * | 6/2003 | Tsukuda .................... | B41J 3/46 |
| | | | | 715/255 |
| 2005/0086580 | A1 | 4/2005 | Horii et al. | |
| 2020/0094578 | A1 * | 3/2020 | Hirabayashi .......... | G06F 3/1284 |

FOREIGN PATENT DOCUMENTS

| | | | | |
|---|---|---|---|---|
| JP | 2000177182 | A | * | 6/2000 | |
| JP | 2005-103929 | A | | 4/2005 | |
| JP | 4300948 | B2 | * | 7/2009 | ............ B41J 11/666 |

* cited by examiner

TAPE PRINTING APPARATUS, METHOD FOR CONTROLLING TAPE PRINTING APPARATUS, INFORMATION PROCESSING APPARATUS, AND NON-TRANSITORY COMPUTER-READABLE STORAGE MEDIUM STORING PROGRAM

The present application is based on, and claims priority from JP Application Serial Number 2024-048444, filed Mar. 25, 2024, the disclosure of which is hereby incorporated by reference herein in its entirety.

BACKGROUND

1. Technical Field

The present invention relates to a tape printing apparatus, a method for controlling a tape printing apparatus, an information processing apparatus, and a non-transitory computer-readable storage medium storing a program.

2. Related Art

As disclosed in JP-A-2005-103929, a tape printer to which sequential number print data and non-sequential number print data can be input is known.

An existing tape printing apparatus has an expansion sequential number function of expanding an input sequential number character string into a plurality of paragraphs provided on a text screen. However, in the existing tape printing apparatus, a non-sequential number character string cannot be input separately from a sequential number character string in the expansion sequential number function. Therefore, a user needs to input a non-sequential number character string for each paragraph on the text screen.

SUMMARY

According to an aspect of the present disclosure, a tape printing apparatus includes a display section and a controller that controls the display section such that a text screen on which a text to be printed is edited, a sequential number character string input screen, and a non-sequential number character string input screen are displayed. The controller receives an input of a sequential number character string in a state where the sequential number character string input screen is displayed. The controller receives an input of a first non-sequential number character string and an input of a second non-sequential number character string in a state where the non-sequential number character string input screen is displayed. The controller controls the display section such that a sequential number update character string obtained by updating the sequential number character string, the first non-sequential number character string, and the second non-sequential number character string are displayed in each of a plurality of paragraphs provided on the text screen.

According to an aspect of the present disclosure, a method for controlling a tape printing apparatus including a display section includes: receiving an input of a sequential number character string in a state where a sequential number character string input screen is displayed on the display section; receiving an input of a first non-sequential number character string and an input of a second non-sequential number character string in a state where a non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided on a text screen displayed on the display section.

According to an aspect of the present disclosure, an information processing apparatus includes a display section and a controller that controls the display section such that a text screen on which a text to be printed is edited, a sequential number character string input screen, and a non-sequential number character string input screen are displayed. The controller receives an input of a sequential number character string in a state where the sequential number character string input screen is displayed. The controller receives an input of a first non-sequential number character string and an input of a second non-sequential number character string in a state where the non-sequential number character string input screen is displayed. The controller controls the display section such that a sequential number update character string obtained by updating the sequential number character string, the first non-sequential number character string, and the second non-sequential number character string are displayed in each of a plurality of paragraphs provided on the text screen.

According to an aspect of the present disclosure, a non-transitory computer-readable storage medium stores a program for causing an information processing apparatus to execute functions of: controlling a display section included in the information processing apparatus such that a text screen on which a text to be printed is edited, a sequential number character string input screen, and a non-sequential number character string input screen are displayed; receiving an input of a sequential number character string in a state where the sequential number character string input screen is displayed on the display section; receiving an input of a first non-sequential number character string and an input of a second non-sequential number character string in a state where the non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided in the text screen.

BRIEF DESCRIPTION OF THE DRAWINGS

FIG. 9 is a diagram illustrating a sequential number character string input screen, a first non-sequential number number character string input screen according to a first embodiment.

FIG. 12 is a diagram illustrating a sequential number character string input screen, a first non-sequential number character string input screen, and a second non-sequential number character string input screen according to a second embodiment.

DESCRIPTION OF EMBODIMENTS

Hereinafter, a tape printing apparatus 1 which is an embodiment of a tape printing apparatus will be described with reference to the accompanying drawings.

Outline of Tape Printing Apparatus and Tape Cartridge

Figure 1:
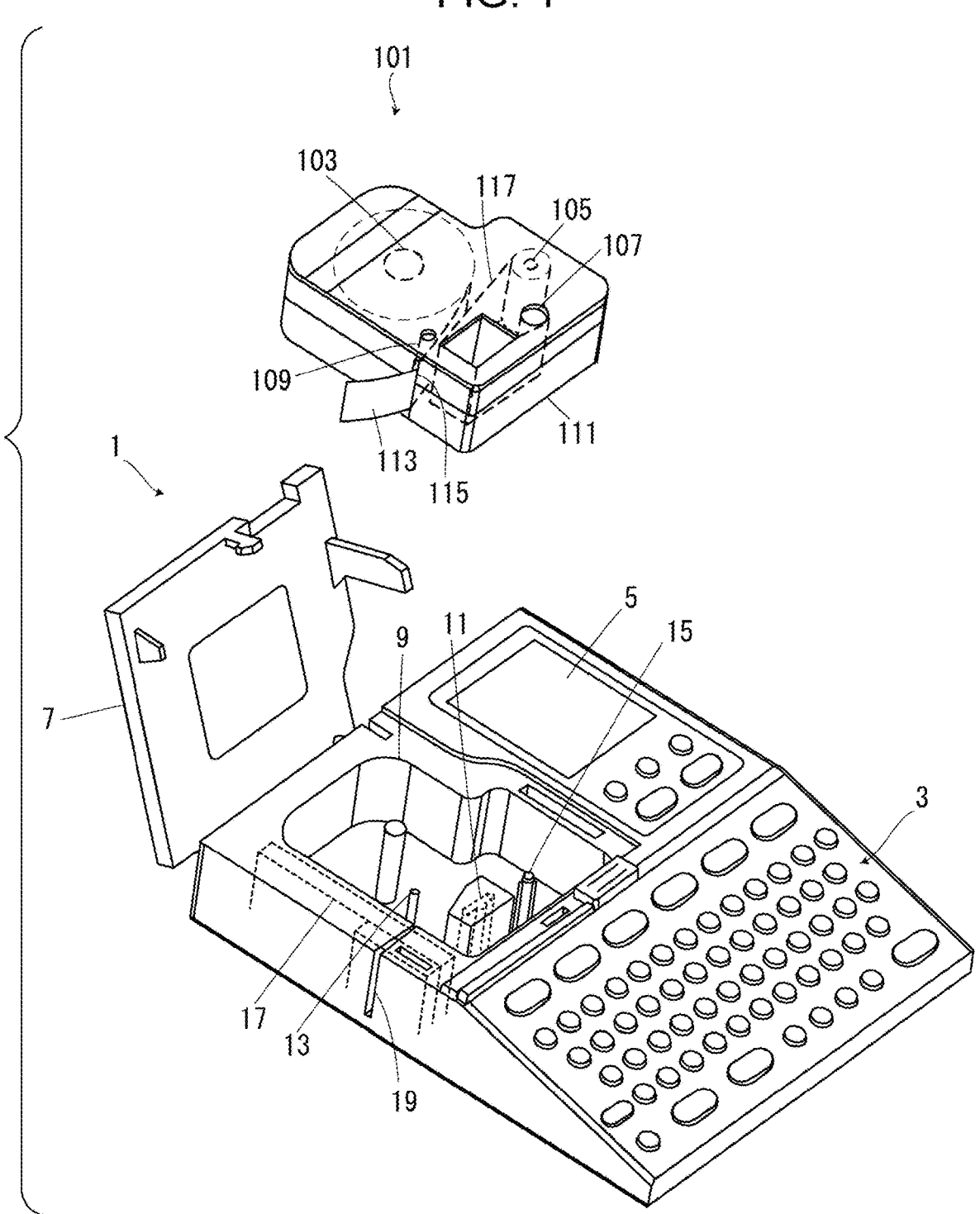
FIG. 1 is an exterior perspective view of a tape printing apparatus and a tape cartridge.

As illustrated in FIG. 1, the tape printing apparatus 1 includes an operation panel 3, a display section 5, a cover 7, a cartridge mounting portion 9, a print head 11, a platen shaft 13, a winding shaft 15, and a cutter 17.

Figure 2:
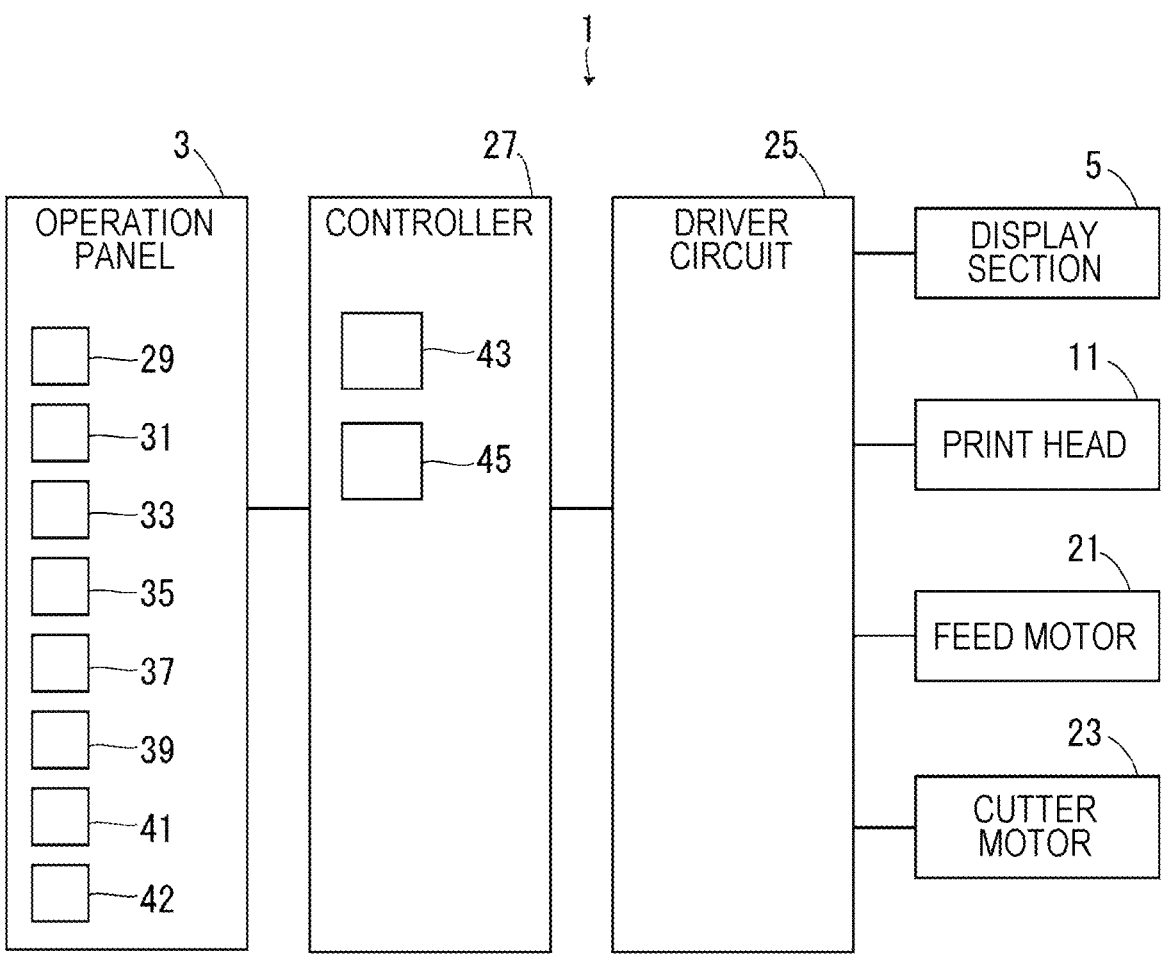
FIG. 2 is a block diagram illustrating a hardware configuration of the tape printing apparatus.

The operation panel 3 is provided with various keys including a character key 29 illustrated in FIG. 2.

Figure 10:
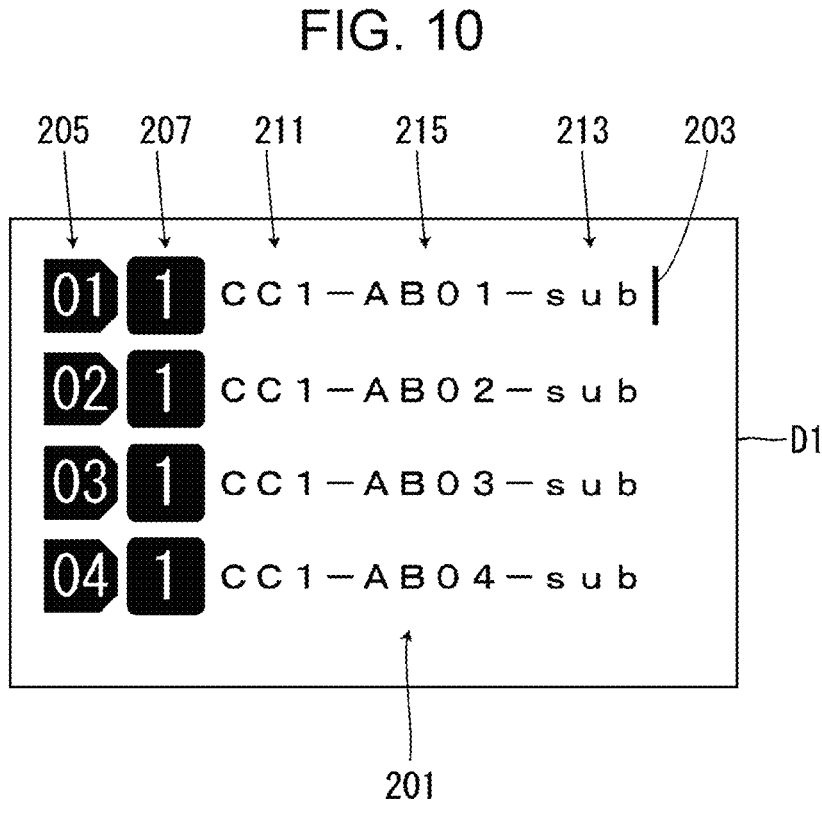
FIG. 10 is a diagram illustrating a text screen according to the first embodiment.

The display section 5 displays a text screen D1 illustrated in FIG. 10 and the like. As the display section 5, for example, a liquid crystal display, an organic EL display, or the like can be used.

The cover 7 opens and closes the cartridge mounting portion 9. The cover 7 is opened and closed for a user to mount a tape cartridge 101 on the cartridge mounting portion 9. The tape cartridge 101 is removably mounted on the cartridge mounting portion 9.

The tape cartridge 101 includes a tape core 103, a feeding core 105, a winding core 107, a platen roller 109, and a cartridge case 111 that houses these components. A tape 113 serving as a print medium is wound around the tape core 103. The tape 113 fed from the tape core 103 is fed out of the cartridge case 111 through a tape feed outlet 115 provided in the cartridge case 111. An ink ribbon 117 is wound around the feeding core 105. The ink ribbon 117 fed from the feeding core 105 is wound around the winding core 107.

The print head 11 performs printing on the tape 113. When the tape cartridge 101 is mounted on the cartridge mounting portion 9, the print head 11 pinches the tape 113 and the ink ribbon 117 between the print head 11 and the platen roller 109. In this state, when the print head 11 generates heat, ink on the ink ribbon 117 is transferred to the tape 113.

When the tape cartridge 101 is mounted on the cartridge mounting portion 9, the platen shaft 13 and the winding shaft 15 are inserted in the platen roller 109 and the winding core 107, respectively. As a result, power of a feed motor 21 illustrated in FIG. 2 can be transmitted to the platen roller 109 and the winding core 107. As the platen roller 109 rotates, the tape 113 and the ink ribbon 117 pinched between the platen roller 109 and the print head 11 are fed. When the winding core 107 rotates, the ink ribbon 117 is wound around the winding core 107.

The cutter 17 is provided between the cartridge mounting portion 9 and a tape outlet 19. The cutter 17 cuts the tape 113 fed from the tape cartridge 101 mounted on the cartridge mounting portion 9 in the width direction of the tape 113. As a result, a printed portion of the tape 113 is cut off, and the cut-off printed portion of the tape 113 is used as a label L illustrated in FIG. 11.

Hardware Configuration of Tape Printing Apparatus

As illustrated in FIG. 2, the tape printing apparatus 1 includes the feed motor 21, a cutter motor 23, a driver circuit 25, and a controller 27 in addition to the display section 5 and the like.

The feed motor 21 is a drive source for the platen roller 109 and the winding core 107. The cutter motor 23 is a drive source for the cutter 17.

The controller 27 controls each section of the tape printing apparatus 1. That is, the controller 27 outputs a control signal to the driver circuit 25 which drives the display section 5, the print head 11, the feed motor 21, and the cutter motor 23. Further, an output signal from the operation panel 3 is input to the controller 27. The operation panel 3 is provided with the character key 29, a line feed mark insertion key 31, a paragraph change key 33, an expansion sequential number key 35, a print key 37, a decoration key 39, a line feed/selection key 41, a shift key 42, and the like.

The controller 27 includes a processor 43 and a storage section 45. As the processor 43, for example, a central processing unit (CPU) or an application specific integrated circuit (ASIC) can be used. The processor 43 reads a program stored in the storage section 45 and executes various kinds of arithmetic processing using a work area in the storage section 45.

The storage section 45 includes, for example, storage elements such as a read-only memory (ROM), a character generator ROM (CGROM), and a random-access memory (RAM). The storage section 45 stores image data in addition to various programs. The image data is bitmap data representing a character, and is stored in association with a character code of each character.

Editing and Printing Process

Figure 3:
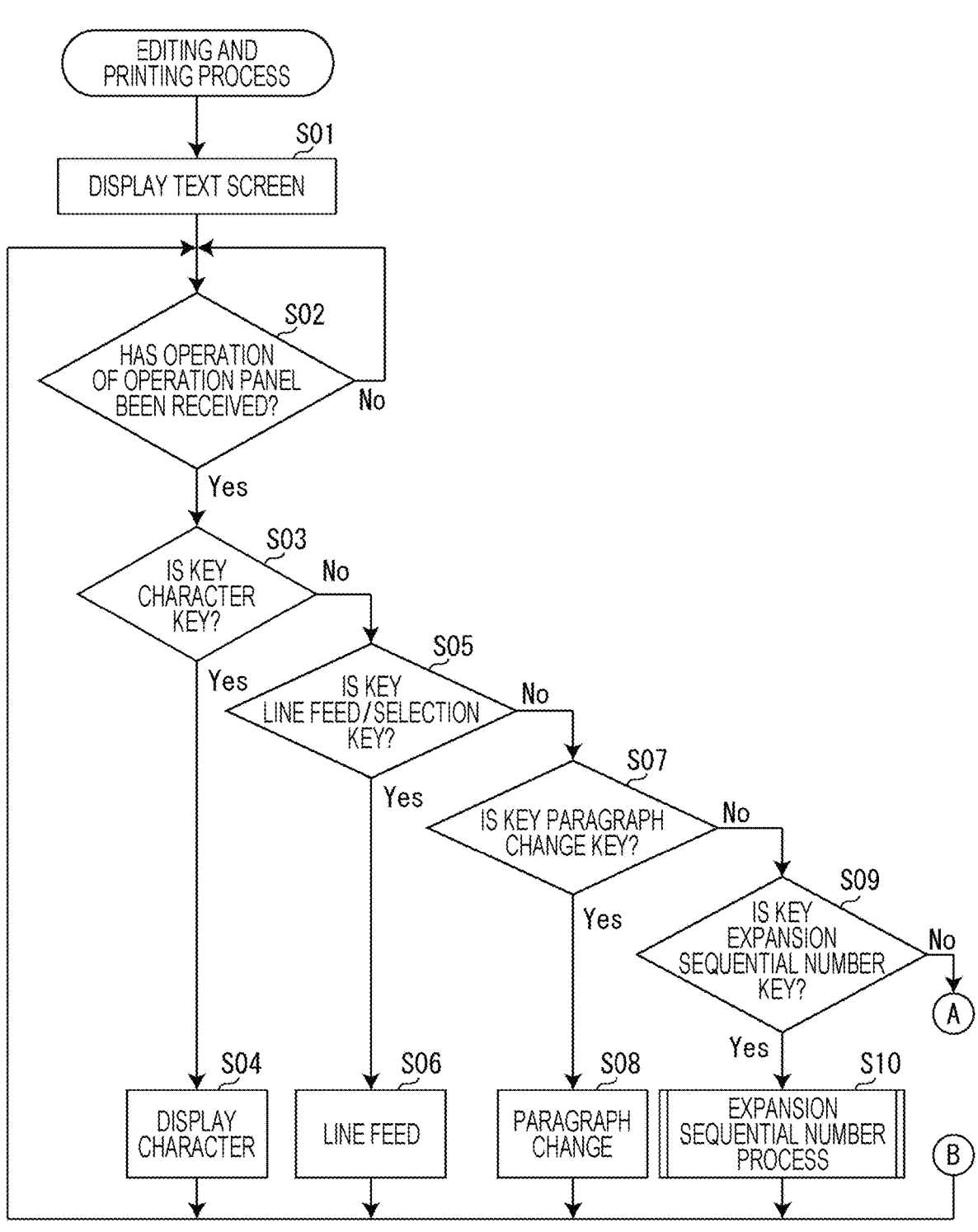
FIG. 3 is a flowchart of an editing and printing process.
Figure 4:
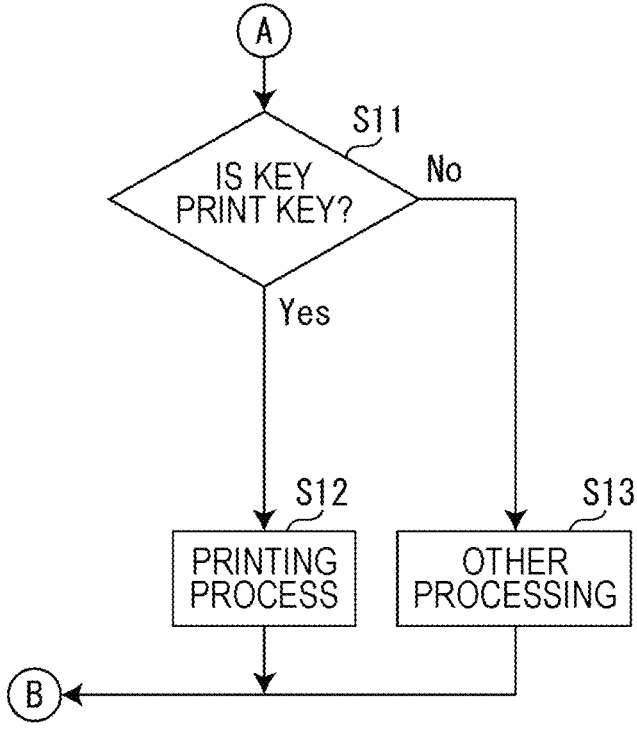
FIG. 4 is a flowchart of the editing and printing process following FIG. 3.

Referring to FIGS. 3 and 4, an editing and printing process that is executed by the controller 27 will be described. The controller 27 performs the editing and printing process by the processor 43 executing a program of the editing and printing process stored in the storage section 45. The controller 27 starts the editing and printing process, for example, when a power source is turned on.

In step S01, the controller 27 causes the display section 5 illustrated in FIG. 10 to display the text screen D1. On the text screen D1, the user edits a text 201 to be printed on the tape 113. The text 201, a cursor 203, a paragraph mark 205, and a head-of-line mark 207 are displayed on the text screen D1. The text 201 has one or more paragraphs and each paragraph has one or more lines. In the example illustrated in FIG. 10, the text 201 includes four paragraphs, and each of the paragraphs includes one line. The paragraph mark 205 indicates the ordinal position of the paragraph. The head-of-line mark 207 indicates the ordinal position of the line in each paragraph. Note that the text 201 includes one or more characters.

In step S02, the controller 27 determines whether an operation of the operation panel 3 by the user, that is, an operation on the various keys provided on the operation panel 3 has been received. When the controller 27 determines that the operation of the operation panel 3 by the user has been received, the process proceeds to step S03.

When the controller 27 determines that the operation of the operation panel 3 by the user has not been received in step S02, step S02 is repeatedly performed.

In step S03, the controller 27 determines whether a key operated by the user is the character key 29. When the controller 27 determines that the key operated by the user is the character key 29, the process proceeds to step S04.

In step S04, the controller 27 displays a character corresponding to the character key 29 operated by the user at the position of the cursor 203 when the character key 29 is operated on the text screen D1. That is, the controller 27 reads image data corresponding to the character key 29 operated by the user from the storage section 45, and controls the display section 5 based on the read image data. As a result, the character corresponding to the character key 29 operated by the user is displayed on the text screen D1. After the controller 27 performs step S04, the process returns to step S02.

In step S03, when the controller 27 determines that the key operated by the user is not the character key 29, the process proceeds to step S05.

In step S05, the controller 27 determines whether the key operated by the user is the line feed/selection key 41. When the controller 27 determines that the key operated by the user is the line feed/selection key 41, the process proceeds to step S06.

In step S06, the controller 27 performs a line feed at the position of the cursor 203 when the line feed/selection key 41 is operated. That is, the controller 27 creates a new line next to the line on which the cursor 203 is positioned when the line feed/selection key 41 is operated. When a character is present at the rear of the cursor 203, the controller 27 moves the character present at the rear of the cursor 203 to the next line. After the controller 27 performs step S06, the process returns to step S02. Note that the rear indicates a direction away from the head-of-line mark 207 on the text screen D1, and indicates the right direction in FIG. 10. In addition, the front indicates a direction toward the head-of-line mark 207 on the text screen D1, and indicates the left direction in FIG. 10.

In step S05, when the controller 27 determines that the key operated by the user is not the line feed/selection key 41, the process proceeds to step S07.

In step S07, the controller 27 determines whether the key operated by the user is the paragraph change key 33. When the controller 27 determines that the key operated by the user is the paragraph change key 33, the process proceeds to step S08.

In step S08, the controller 27 performs a paragraph change at the position of the cursor 203 when the paragraph change key 33 is operated. That is, the controller 27 creates a new paragraph next to the paragraph where the cursor 203 is positioned when the paragraph change key 33 is operated. When a character is present at the rear of the cursor 203, the controller 27 moves the character present at the rear of the cursor 203 to the next paragraph. After the controller 27 performs step S08, the process returns to step S02.

In step S07, when the controller 27 determines that the key operated by the user is not the paragraph change key 33, the process proceeds to step S09.

In step S09, the controller 27 determines whether the key operated by the user is the expansion sequential number key 35. When the controller 27 determines that the key operated by the user is the expansion sequential number key 35, the process proceeds to step S10.

In step S10, the controller 27 performs an expansion sequential number process to be described later. After the controller 27 performs step S10, the process returns to step S02.

In step S09, when the controller 27 determines that the key operated by the user is not the expansion sequential number key 35, the process proceeds to step S11.

In step S11, the controller 27 determines whether the key operated by the user is the print key 37. When the controller 27 determines that the key operated by the user is the print key 37, the process proceeds to step S12.

In step S12, the controller 27 performs a printing process. That is, the controller 27 reads image data of each character constituting the text 201 from the storage section 45 based on a result of editing the text 201 on the text screen D1, and generates print data based on the read image data. The controller 27 controls the print head 11, the feed motor 21, and the cutter motor 23 based on the generated print data. As a result, the text 201 edited on the text screen D1 is printed on the tape 113, and a label L is created. After the controller 27 performs step S12, the process returns to step S02.

In step S12, when the controller 27 determines that the key operated by the user is not the print key 37, the process proceeds to step S13.

In step S13, the controller 27 executes other processing in accordance with the operated key. The other processing is, for example, cancellation of the operation. After the controller 27 performs step S13, the process returns to step S02.

Expansion Sequential Number Process

Figure 5:
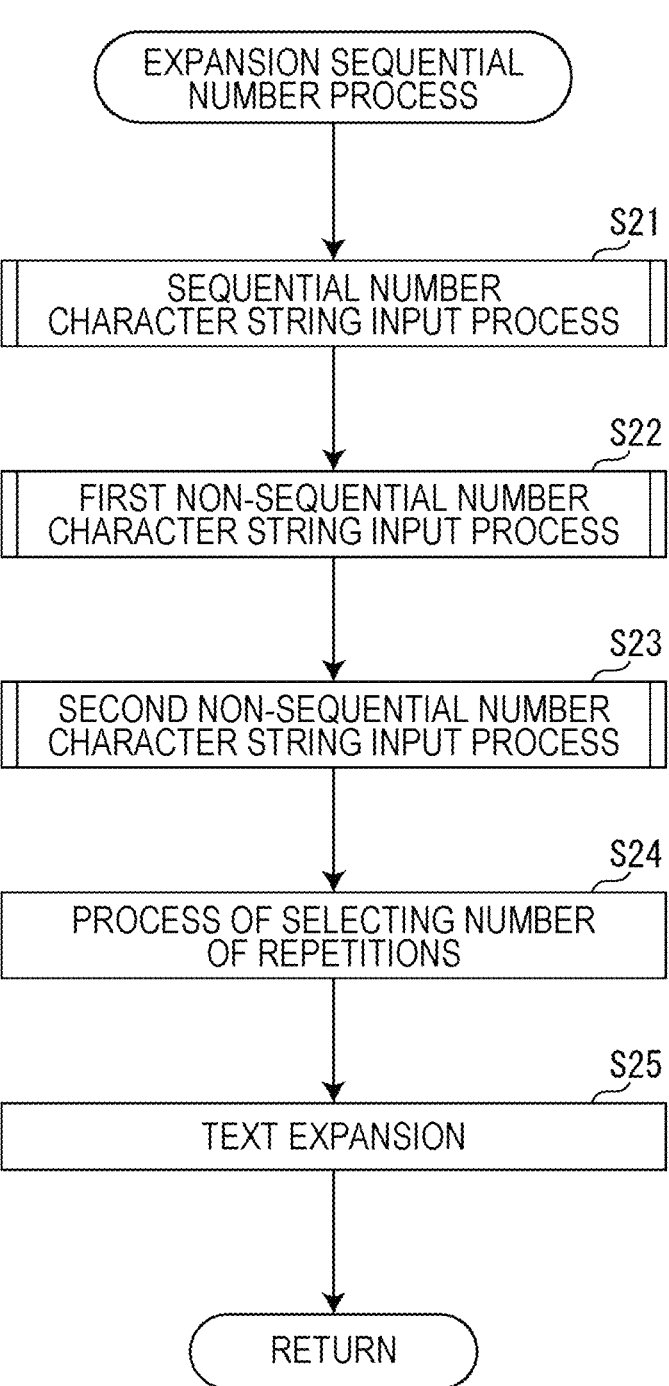
FIG. 5 is a flowchart of an expansion sequential number process.

The expansion sequential number process will be described with reference to FIG. 5. In step S21, the controller 27 executes a sequential number character string input process, and receives an input of a sequential number character string 209 illustrated in FIG. 9.

Figure 9:
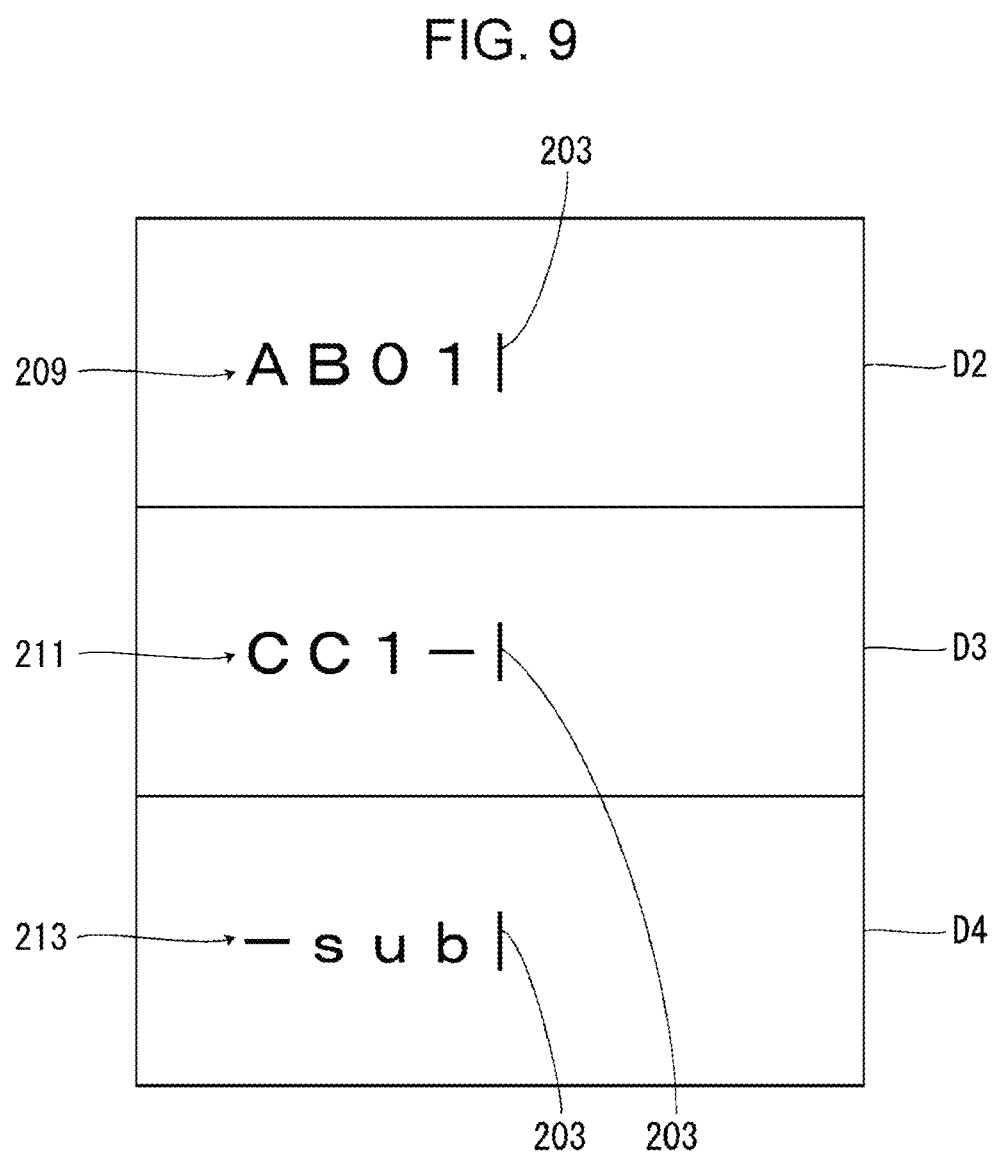

In step S22, the controller 27 executes a first non-sequential number character string input process, and receives an input of a first non-sequential number character string 211 illustrated in FIG. 9.

In step S23, the controller 27 executes a second non-sequential number character string input process, and receives an input of a second non-sequential number character string 213 illustrated in FIG. 9.

In step S24, the controller 27 executes a process of selecting the number of repetitions. For example, the controller 27 causes the display section 5 to display a repetition number selection screen (not illustrated). On the repetition number selection screen, repetition number options indicating the numbers of repetitions are displayed. The controller 27 sets the number of repetitions based on a repetition number option selected by the user. As will be described later, the number of repetitions indicates the number of times the same number is repeated in a sequential number update character string 215 obtained by updating the sequential number character string 209, that is, by counting up the sequential number character string 209. For example, when the sequential number character string 209 is "001" and the number of repetitions is set to 2, the sequential number update character string 215 is "001", "001", "002", "002", and "003".

Figure 6:
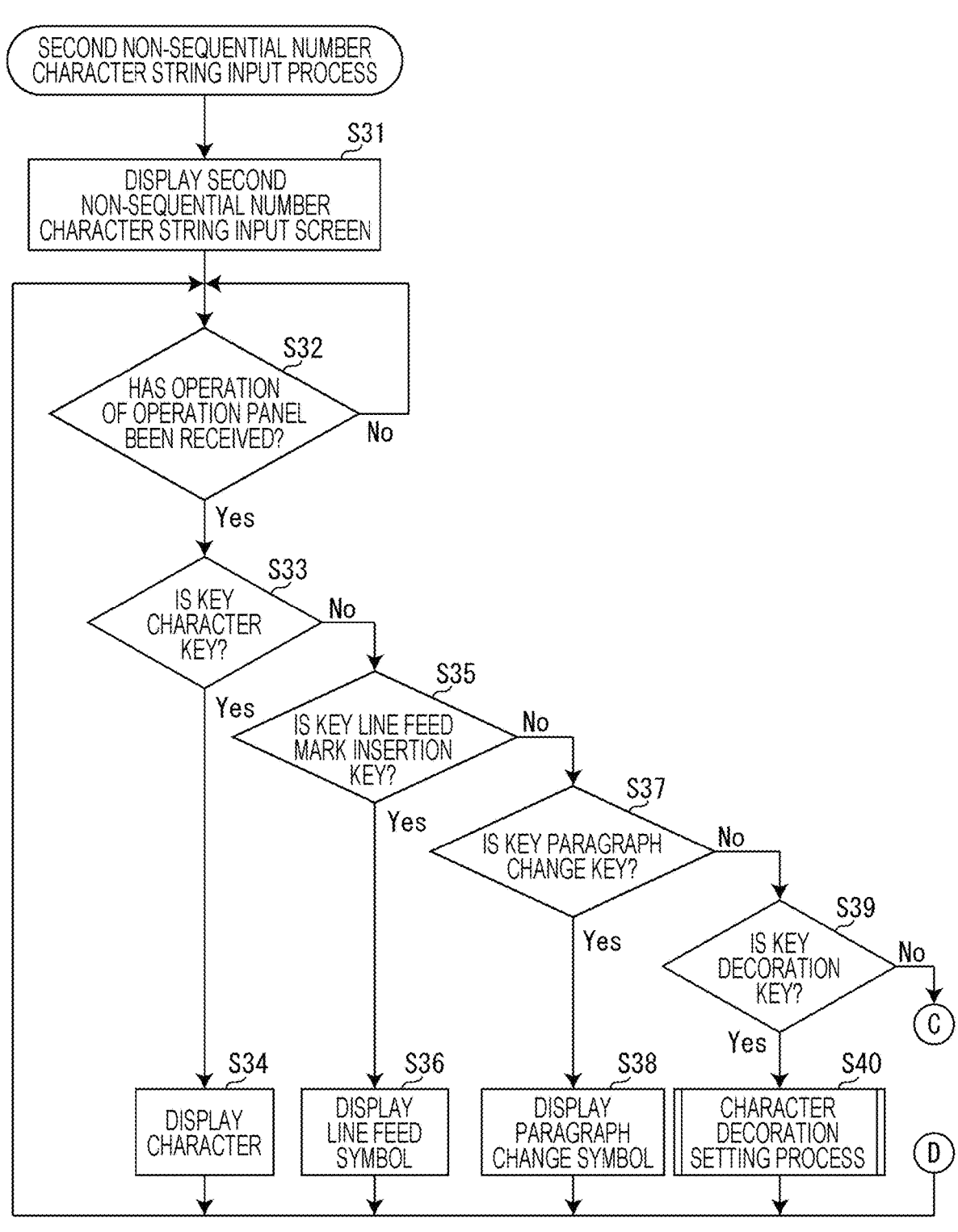
FIG. 6 is a flowchart of a second non-sequential number character string input process.
Figure 7:
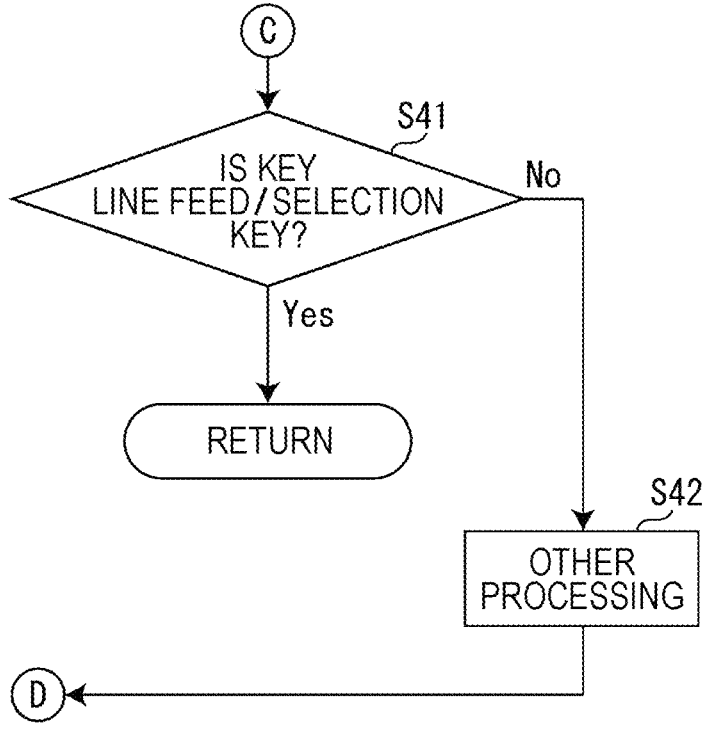
FIG. 7 is a flowchart of the second non-sequential number character string input process following FIG. 6.

In step S25, the controller 27 performs text expansion. That is, the controller 27 controls the display section 5 based on the sequential number character string 209, the first non-sequential number character string 211, and the second non-sequential number character string 213 input in steps S21 to S23. As a result, on the text screen D1, the sequential number update character string 215 obtained by updating the sequential number character string 209, the first non-sequential number character string 211, and the second non-sequential number character string 213 are displayed in each of the plurality of paragraphs provided on the text screen D1, as illustrated in FIG. 10. In each of the paragraphs, the first non-sequential number character string 211, the sequential number update character string 215, and the second non-sequential number character string 213 are displayed in this order. That is, the first non-sequential number character string 211 is arranged at the front of the sequential number update character string 215, and the second non-sequential number character string 213 is arranged at the rear of the sequential number update character string 215. After the controller 27 performs step S25, the process returns to the editing and printing process illustrated in FIG. 3. Second Non-Sequential Number Character String Input Process The second non-sequential number character string input process will be described with reference to FIGS. 6 and 7. Since the sequential number character string input process and the first non-sequential number character string input process are performed in a similar manner to the second non-sequential number character string input process, the second non-sequential number character string input process will be described as a representative example.

In step S31, the controller 27 causes the display section 5 to display a second non-sequential number character string input screen D4 illustrated in FIG. 9.

In step S32, the controller 27 determines whether an operation of the operation panel 3 by the user has been received. When the controller 27 determines that the operation of the operation panel 3 by the user has been received, the process proceeds to step S33.

When the controller 27 determines that the operation of the operation panel 3 by the user has not been received in step S32, step S32 is repeatedly performed.

In step S33, the controller 27 determines whether a key operated by the user is the character key 29. When the controller 27 determines that the key operated by the user is the character key 29, the process proceeds to step S34.

In step S34, the controller 27 displays, on the second non-sequential number character string input screen D4, a character corresponding to the character key 29 operated by the user at the position of the cursor 203 when the character key 29 is operated. After the controller 27 performs step S34, the process returns to step S32.

In step S33, when the controller 27 determines that the key operated by the user is not the character key 29, the process proceeds to step S35.

In step S35, the controller 27 determines whether the key operated by the user is the line feed mark insertion key 31. When the controller 27 determines that the key operated by the user is the line feed mark insertion key 31, the process proceeds to step S36.

Figure 12:
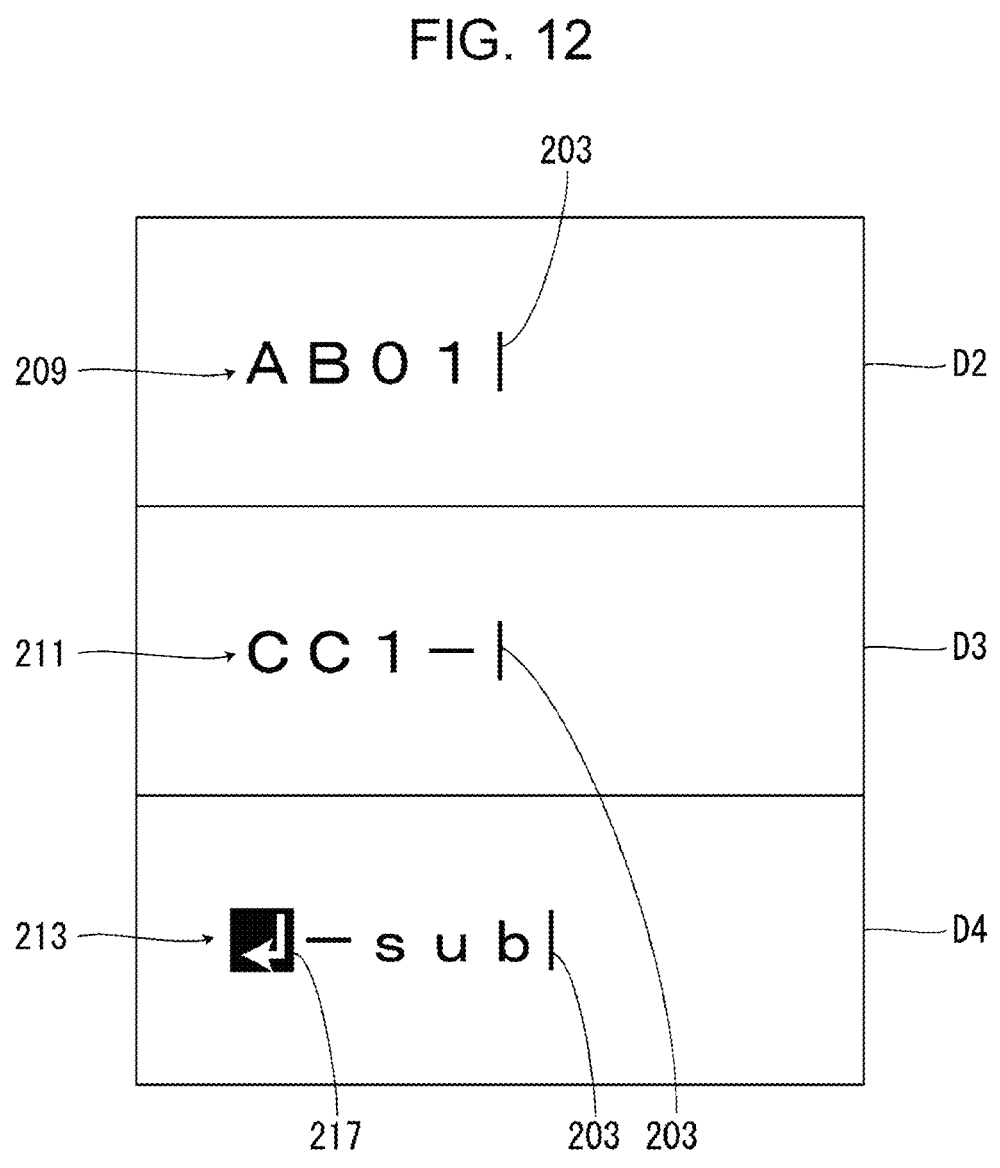

In step S36, as illustrated in FIG. 12, the controller 27 displays, on the second non-sequential number character string input screen D4, a line feed symbol 217 at the position of the cursor 203 when the line feed mark insertion key 31 is operated. The user can input the line feed symbol 217 to any position in the second non-sequential number character string 213 by moving the cursor 203 in advance. After the controller 27 performs step S36, the process returns to step S32. The line feed symbol 217 is an example of an "editing symbol".

In step S35, when the controller 27 determines that the key operated by the user is not the line feed mark insertion key 31, the process proceeds to step S37.

In step S37, the controller 27 determines whether the key operated by the user is the paragraph change key 33. When the controller 27 determines that the key operated by the user is the paragraph change key 33, the process proceeds to step S38.

Figure 15:
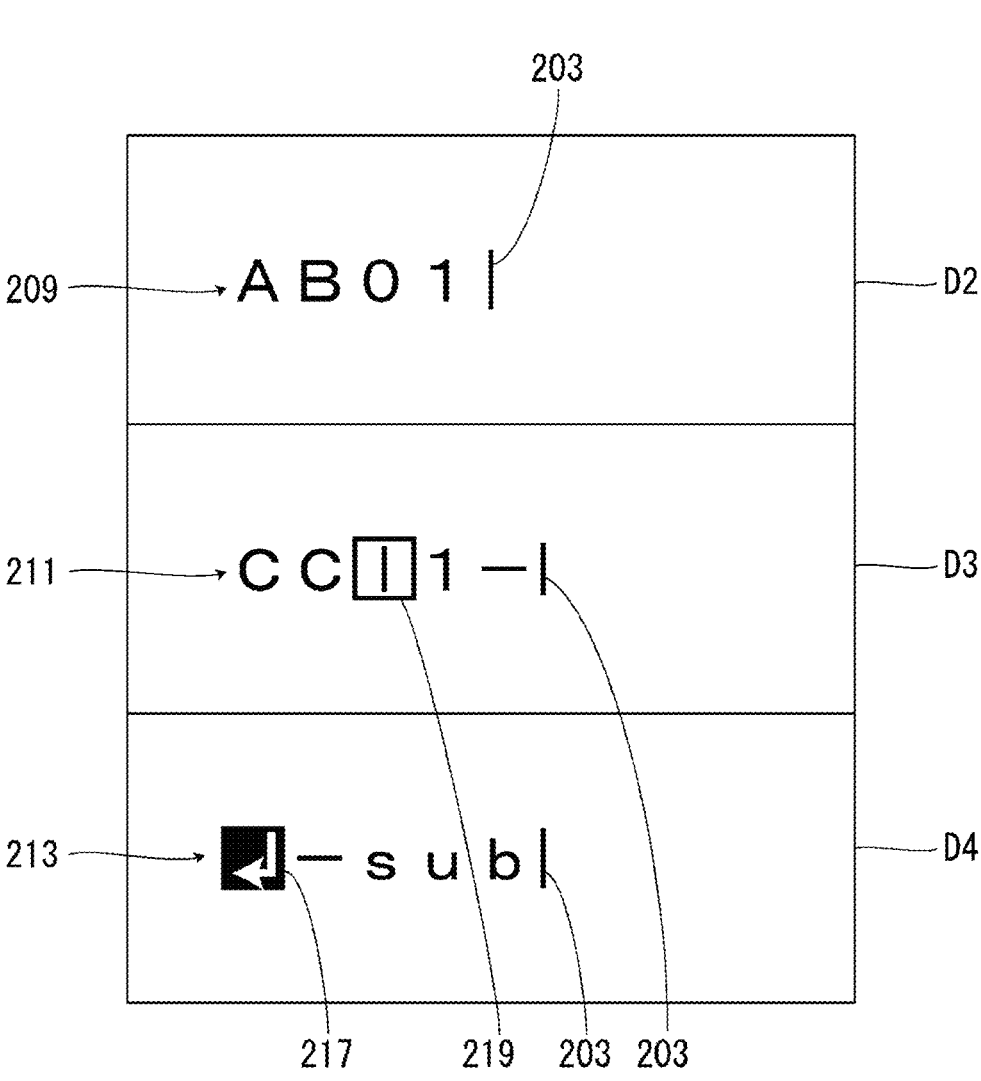
FIG. 15 is a diagram illustrating a sequential number character string input screen, a first non-sequential number number character string input screen according to a third embodiment.

In step S38, the controller 27 displays, on the second non-sequential number character string input screen D4, a paragraph change symbol 219 (an example displayed on a first non-sequential number character string input screen D3, see FIG. 15) at the position of the cursor 203 when the paragraph change key 33 is operated. The user can input the paragraph change symbol 219 to any position in the second non-sequential number character string 213 by moving the cursor 203 in advance. After the controller 27 performs step S38, the process returns to step S32. The paragraph change symbol 219 is an example of the "editing symbol".

In step S37, when the controller 27 determines that the key operated by the user is not the paragraph change key 33, the process proceeds to step S39.

In step S39, the controller 27 determines whether the key operated by the user is the decoration key 39. When the controller 27 determines that the key operated by the user is the decoration key 39, the process proceeds to step S40.

In step S40, the controller 27 performs a character decoration setting process to be described later. After the controller 27 performs step S40, the process returns to step S32.

In step S40, when the controller 27 determines that the key operated by the user is not the decoration key 39, the process proceeds to step S41.

In step S41, the controller 27 determines whether the key operated by the user is the line feed/selection key 41. When the controller 27 determines that the key operated by the user is the line feed/selection key 41, the process returns to the expansion sequential number process illustrated in FIG. 5.

In step S41, when the controller 27 determines that the key operated by the user is not the line feed/selection key 41, the process proceeds to step S42.

In step S42, the controller 27 executes other processing in accordance with the operated key. The other processing is, for example, cancellation of the operation. After the controller 27 performs step S42, the process returns to step S32.

As illustrated in FIG. 15, when the controller 27 receives an input of the line feed symbol 217 or an input of the paragraph change symbol 219 (see FIG. 15), the controller 27 performs a line feed or a paragraph change in each of the plurality of paragraphs on the text screen D1 in the text expansion executed in step S25. That is, the controller 27 controls the display section 5 such that the sequential number update character string 215, the first non-sequential number character string 211, and the second non-sequential number character string 213 are displayed on the text screen D1 illustrated in FIG. 16 in a state where a line feed is performed at the position of the line feed symbol 217 or in a state where a paragraph change is performed at the position of the paragraph change symbol 219 (see FIG. 16).

Character Decoration Setting Process

Figure 8:
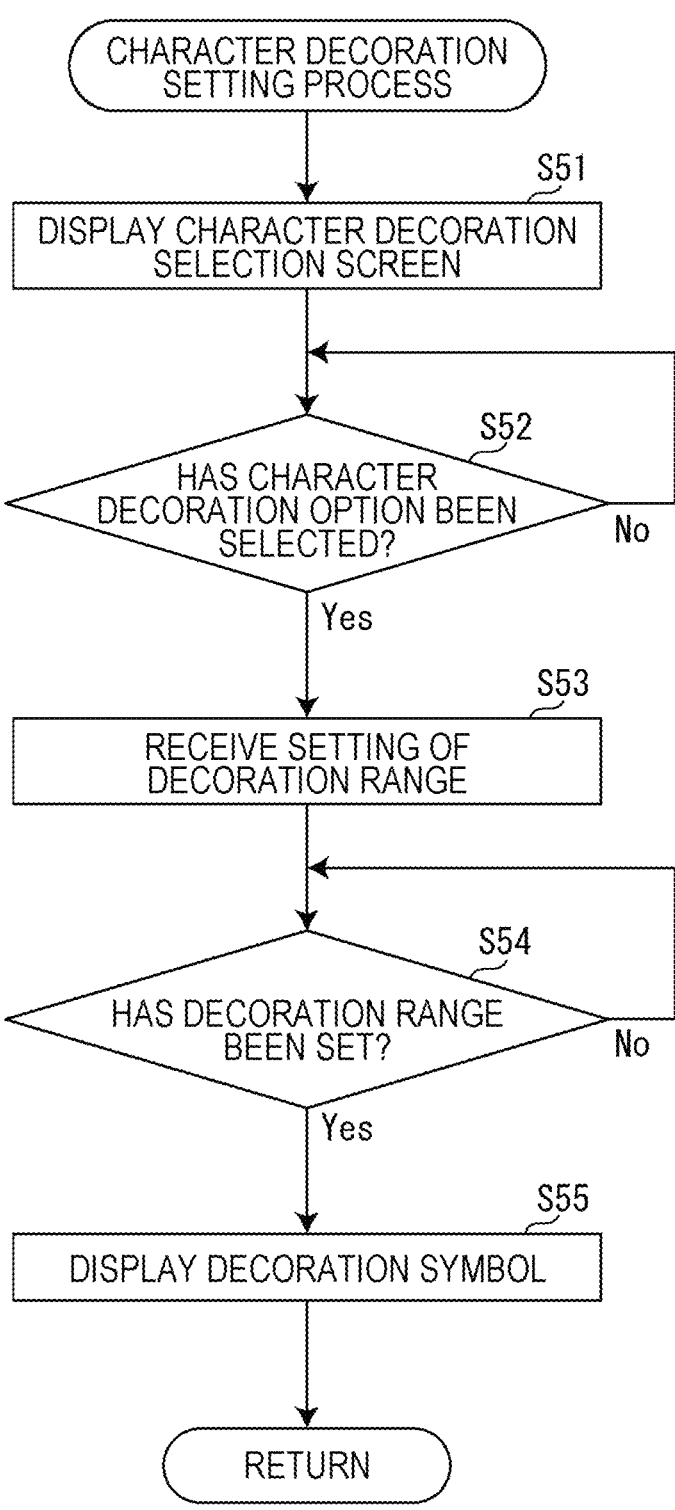
FIG. 8 is a flowchart of a character decoration setting process.

The character decoration setting process will be described with reference to FIG. 8. In the character decoration setting process, character decoration, that is, setting for decorating a character to be printed or changing the design of a character to be printed is performed.

Figure 24:
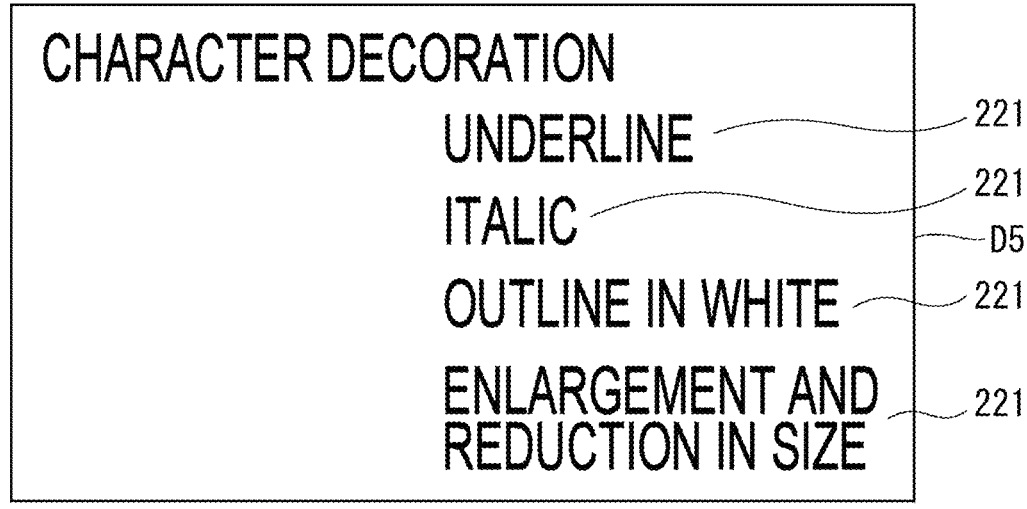
FIG. 24 is a diagram illustrating a character decoration selection screen.

In step S51, as illustrated in FIG. 24, the controller 27 causes the display section 5 to display a character decoration selection screen D5 (see FIG. 24). A plurality of character decoration options 221 are displayed on the character decoration selection screen D5. The character decoration options 221 include, for example, "underline", "italic", "outline in white", and "enlargement and reduction in size".

In step S52, the controller 27 determines whether a character decoration option 221 has been selected by the user. When the controller 27 determines that a character decoration option 221 has been selected by the user, the process proceeds to step S53.

When the controller 27 determines that any character decoration option 221 has not been selected by the user in step S52, the controller 27 repeats step S52.

In step S53, the controller 27 receives setting of a decoration range by the user.

In step S54, the controller 27 determines whether the decoration range has been set by the user. When the controller 27 determines that the decoration range has been set by the user, the process proceeds to step S55.

When the controller 27 determines that a decoration range option 223 has not been selected by the user in step S54, the controller 27 repeats step S54.

Figure 18:
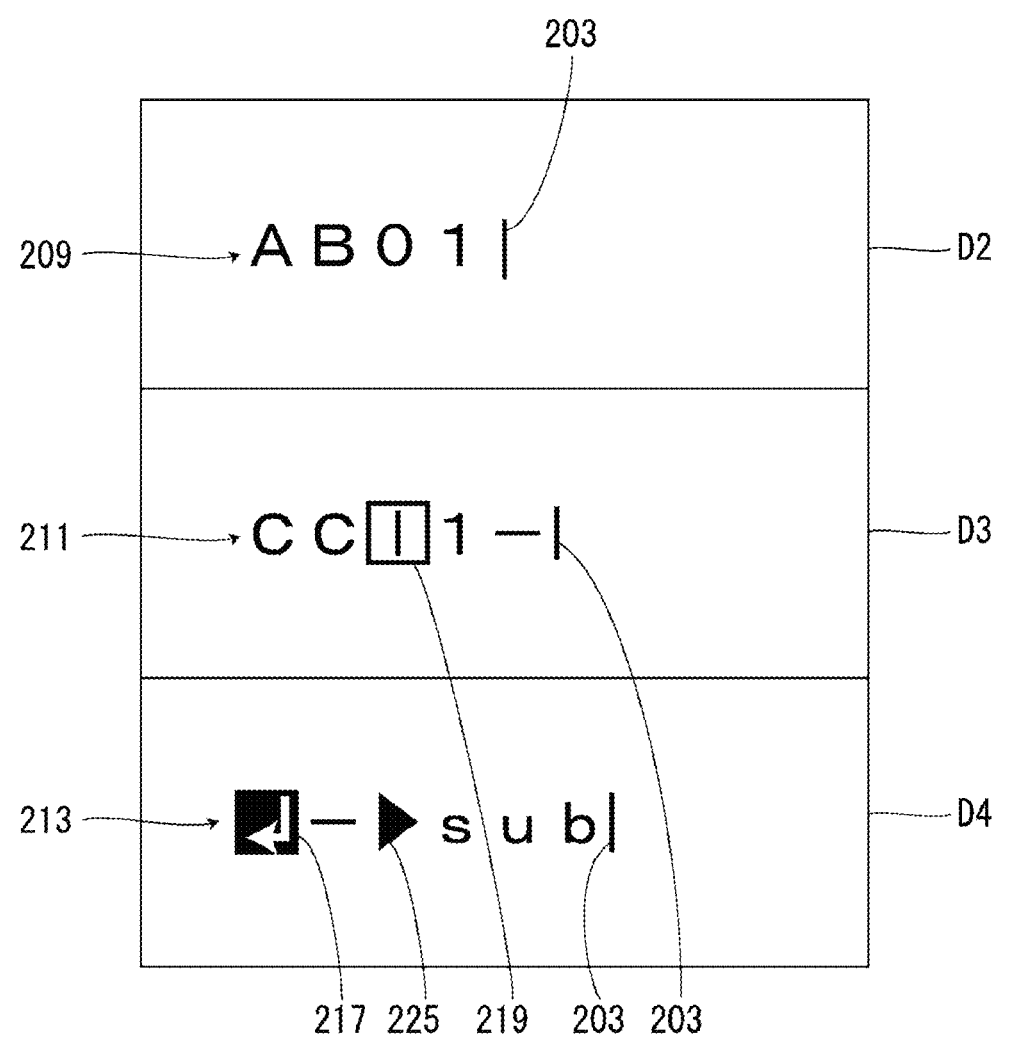
FIG. 18 is a diagram illustrating a sequential number character string input screen, a first non-sequential number character string input screen, and a second non-sequential number character string input screen according to a fourth embodiment.

In step S55, the controller 27 displays a decoration symbol 225 on the second non-sequential number character string input screen D4, as illustrated in FIG. 18. After the controller 27 performs step S55, the process returns to the second non-sequential number character string input process illustrated in FIG. 6.

When the controller 27 receives the setting of the character decoration in the character decoration setting process, the controller 27 controls the display section 5 such that the "decoration symbol 225" illustrated in FIG. 29 is displayed in each of the plurality of paragraphs on the text screen D1 in the text expansion executed (in step S25).

First Embodiment

Next, the expansion sequential number process will be described in detail with reference to first to fifth embodiments. In the following embodiments, it is assumed that four paragraphs are provided in advance on the text screen D1. In addition, it is assumed that "one time" is selected as the number of repetitions on the repetition number selection screen.

Figure 11:
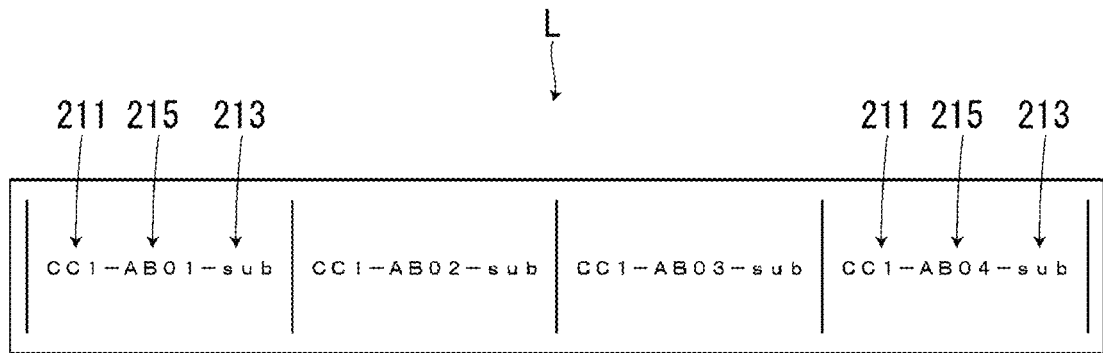
FIG. 11 is a diagram illustrating a label according to the first embodiment.

The first embodiment will be described with reference to FIGS. 9 to 11. In the first embodiment, "AB01" is input as the sequential number character string 209 on a sequential number character string input screen D2, "CC1-" is input as the first non-sequential number character string 211 on the first non-sequential number character string input screen D3, and "-sub" is input as the second non-sequential number character string 213 on the second non-sequential number character string input screen D4.

In this case, on the text screen D1, as illustrated in FIG. 10, "CC1-AB01-sub" is displayed in the first paragraph, "CC1-AB02-sub" is displayed in the second paragraph, "CC1-AB03-sub" is displayed in the third paragraph, and "CC1-AB04-sub" is displayed in the fourth paragraph. That is, on the text screen D1, as the sequential number update character string 215, "AB01" is displayed in the first paragraph, "AB02" is displayed in the second paragraph, "AB03" is displayed in the third paragraph, and "AB04" is displayed in the fourth paragraph. In each of the paragraphs, "CC1-" is displayed as the first non-sequential number character string 211 at the front of the sequential number update character string 215, and "-sub" is displayed as the second non-sequential number character string 213 at the rear of the sequential number update character string 215. When the print key 37 is operated in this state, as illustrated in FIG. 11, the label L on which the sequential number update character string 215, the first non-sequential number character string 211, and the second non-sequential number character string 213 are printed in each of the four paragraphs is created.

Unlike the present embodiment, a configuration is assumed in which the controller 27 receives an input of the sequential number character string 209, but does not receive an input of the first non-sequential number character string 211 and an input of the second non-sequential number character string 213. In this case, in order to create the label L illustrated in FIG. 11, the user first inputs "CC1-AB01" as the sequential number character string 209. As a result, on the text screen D1, as the sequential number update character string 215, "CC1-AB01" is displayed in the first paragraph, "CC1-AB02" is displayed in the second paragraph, "CC1-AB03" is displayed in the third paragraph, and "CC1-AB04" is displayed in the fourth paragraph.

Subsequently, the user inputs a character string which is not a target for a sequential number, that is, "-sub" which is a character string which is not desired by the user to be counted up, at the rear of the sequential number update character string 215 for each of the paragraphs on the text screen D1. It may take time and effort to input "-sub" for each of the paragraphs, and there is a possibility that the input operation may be incorrectly performed.

When the user inputs "CC1-AB01-sub" as the sequential number character string 209, "-sub" becomes the target for the sequential number. That is, on the text screen D1, as the sequential number update character string 215, "CC1-AB01-sub" is displayed in the first paragraph, "CC1-AB01-suc" is displayed in the second paragraph, "CC1-AB01-sud" is displayed in the third paragraph, and "CC1-AB01-sue" is displayed in the fourth paragraph.

On the other hand, in the present embodiment, the controller 27 receives the input of the first non-sequential number character string 211 and the input of the second non-sequential number character string 213 in addition to the input of the sequential number character string 209. Therefore, in order to create the label L illustrated in FIG. 11, as described above, the user may input "AB01" as the sequential number character string 209, input "CC1-" as the first non-sequential number character string 211, and input "-sub" as the second non-sequential number character string 213. That is, the user does not need to input "-sub" for each of the paragraphs on the text screen D1. Therefore, it is possible to save time and effort to input "-sub" for each of the paragraphs, and it is also possible to prevent an input operation from being incorrectly performed.

Second Embodiment

Figure 13:
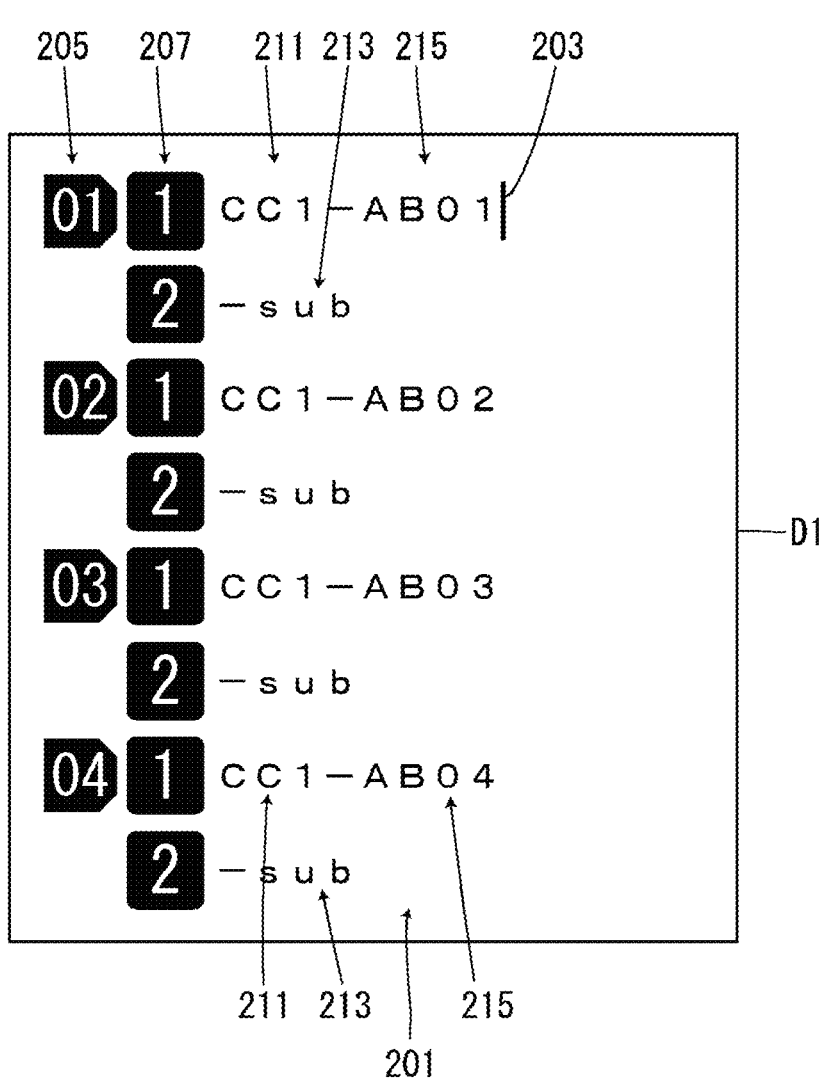
FIG. 13 is a diagram illustrating a text screen according to the second embodiment.
Figure 14:
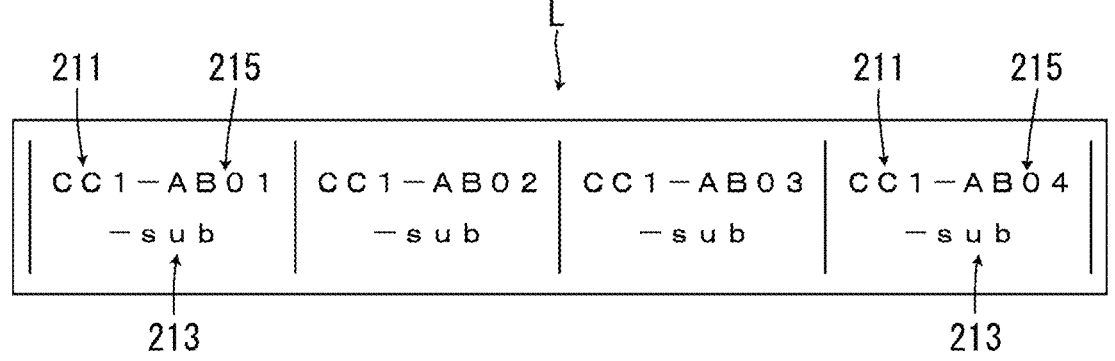
FIG. 14 is a diagram illustrating a label according to the second embodiment.

The second embodiment will be described with reference to FIGS. 12 to 14. The second embodiment is different from the first embodiment in that the line feed symbol 217 is input at the front of the second non-sequential number character string 213 "-sub" on the second non-sequential number character string input screen D4.

In this case, on the text screen D1, in each of the plurality of paragraphs, the sequential number update character string 215, the first non-sequential number character string 211, and the second non-sequential number character string 213 are displayed in a state where a line feed is performed at the position of the line feed symbol 217, that is, in each of the paragraphs, "CC1-AB0n" is displayed in the first line and "-sub" is displayed in the second line. "n" represents an integer of 1 or greater and 4 or less. When the print key 37 is operated in this state, a label L illustrated in FIG. 14 is created. In a label attached to a wiring board such as a patch panel, a predetermined block pitch, that is, each paragraph may be fixed to a predetermined length. In this case, when the number of characters per line in each paragraph increases, the size of each character decreases. As in the present embodiment, by increasing the number of lines included in each paragraph, the size of each character per line to be printed on the tape 113 increases, and thus it is possible to suppress difficulty in reading.

Unlike the present embodiment, a configuration is assumed in which the controller 27 does not receive an input of the editing symbol. In this case, in order to create the label L illustrated in FIG. 14, the user first inputs "AB01" as the sequential number character string 209, inputs "CC1-" as the first non-sequential number character string 211, and inputs "-sub" as the second non-sequential number character string 213, as in the first embodiment. As a result, "CC1-AB0n-sub" is displayed in each of the paragraphs on the text screen D1.

Subsequently, the user performs a line feed operation for each of the paragraphs on the text screen D1. That is, the user operates the line feed/selection key 41 in a state where the cursor 203 is present between "AB0n" and "-sub" for each of the paragraphs. It may take time and effort to perform the line feed operation for each of the paragraphs, and there is a possibility that the line feed operation may be incorrectly performed.

On the other hand, in the present embodiment, the controller 27 receives the input of the editing symbol. Therefore, in order to create the label L illustrated in FIG. 14, the user may input the line feed symbol 217 at the front of "-sub" on the second non-sequential number character string input screen D4. That is, the user does not need to perform a line feed operation for each of the paragraphs on the text screen D1. Therefore, it is possible to save time and effort to perform the line feed operation for each of the paragraphs, and it is possible to prevent the line feed operation from being incorrectly performed.

Third Embodiment

Figure 16:
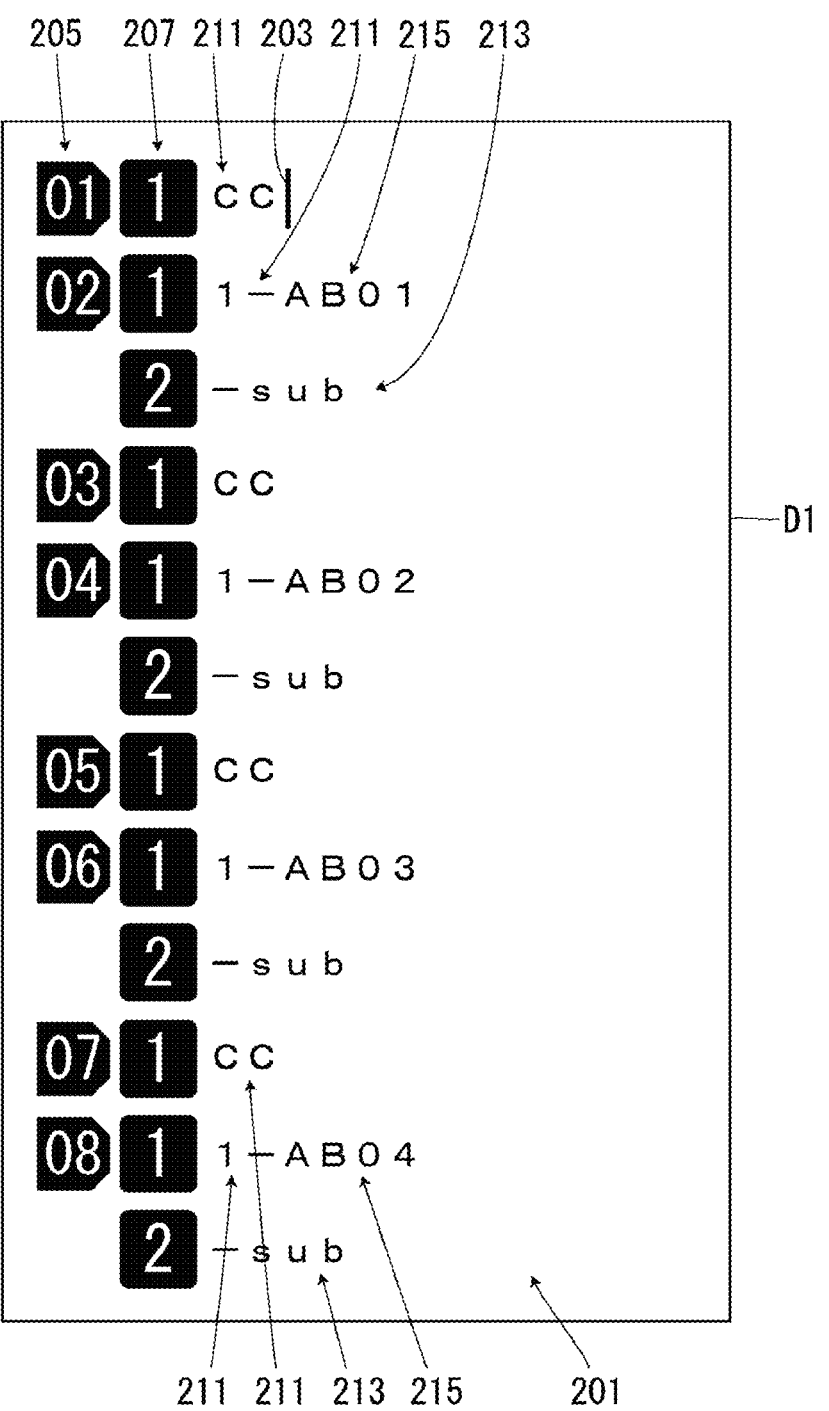
FIG. 16 is a diagram illustrating a text screen according to the third embodiment.
Figure 17:
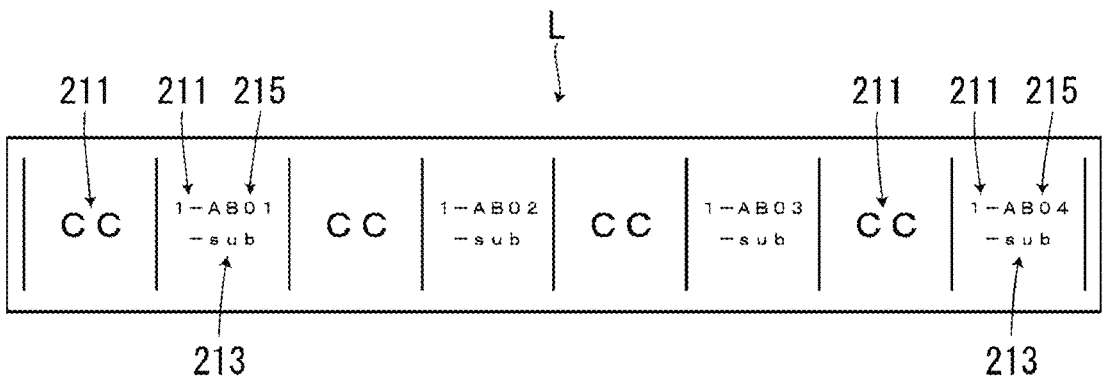
FIG. 17 is a diagram illustrating a label according to the third embodiment.

The third embodiment will be described with reference to FIGS. 15 to 17. The third embodiment is different from the second embodiment in that the paragraph change symbol 219 is input in the middle of the first non-sequential number character string 211, that is, between "CC" and "1-" on the first non-sequential number character string input screen D3. As in the second embodiment, the line feed symbol 217 is input to the second non-sequential number character string input screen D4.

In this case, on the text screen D1, in each of the plurality of paragraphs, the sequential number update character string 215, the first non-sequential number character string 211, and the second non-sequential number character string 213 are displayed in a state where a paragraph change is performed at the position of the paragraph change symbol 219 and a line feed is performed at the position of the line feed symbol 217. That is, since a paragraph change is performed in each of the plurality of paragraphs, the number of paragraphs is eight. Then, "CC" is displayed in the odd-numbered paragraphs, that is, the first paragraph, the third paragraph, the fifth paragraph, and the seventh paragraph. Furthermore, in the even-numbered paragraphs, that is, the second paragraph, the fourth paragraph, the sixth paragraph, and the eighth paragraph, "1-AB0n" is displayed in the first line, and "-sub" is displayed in the second line. When the print key 37 is operated in this state, a label L illustrated in FIG. 17 is created.

Fourth Embodiment

Figure 19:
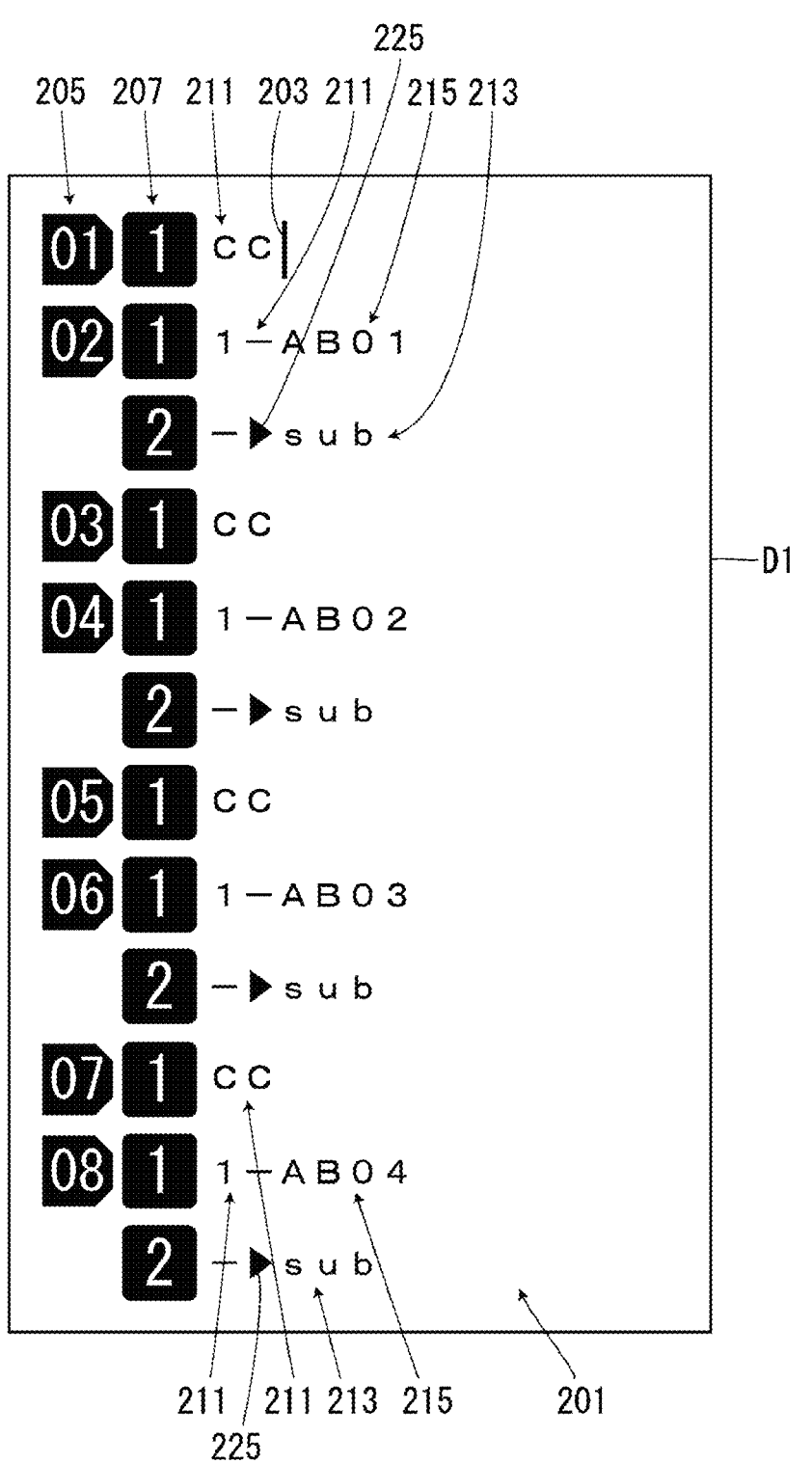
FIG. 19 is a diagram illustrating a text screen according to the fourth embodiment.
Figure 20:
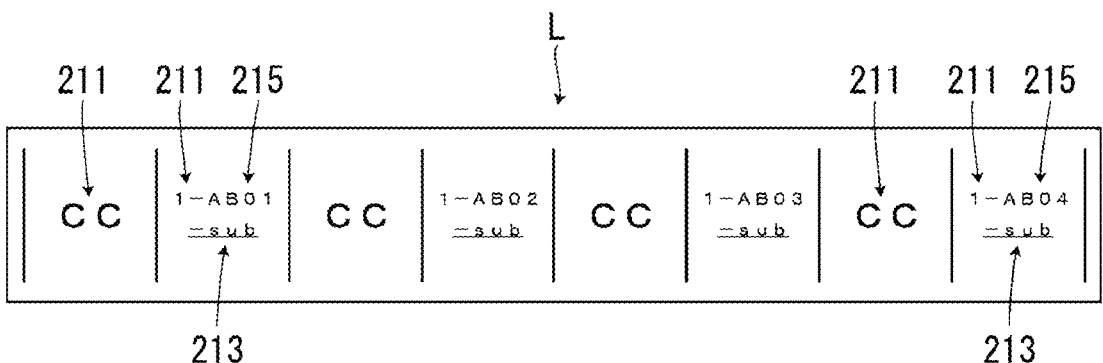
FIG. 20 is a diagram illustrating a label according to the fourth embodiment.

The fourth embodiment will be described with reference to FIGS. 18 to 20. The fourth embodiment is different from the third embodiment in that the character decoration "underline" is set for "sub" of the second non-sequential number character string 213 "-sub" on the second non-sequential number character string input screen D4. That is, it is assumed that the start position of the character decoration is set in a state where the cursor 203 is present between "–" and "s". Therefore, the decoration symbol 225 is displayed between "–" and "s" on the second non-sequential number character string input screen D4. As in the third embodiment, the paragraph change symbol 219 is input to the first non-sequential number character string input screen D3, and the line feed symbol 217 is input to the second non-sequential number character string input screen D4.

In this case, the decoration symbol 225 is displayed in each of the plurality of paragraphs on the text screen D1 in accordance with the setting of the character decoration. That is, in each of the even-numbered paragraphs, the decoration symbol 225 is displayed between "–" and "sub" in the second line. On the text screen D1, the decoration symbol 225 indicates that character decoration is set for characters present in a range from the decoration symbol 225 to the next decoration symbol 225 or the end of a line. When the print key 37 is operated in this state, a label L illustrated in FIG. 20 is created.

Unlike the present embodiment, a configuration is assumed in which the controller 27 does not receive the setting of the character decoration. In this case, in order to create the label L illustrated in FIG. 20, the user first inputs "AB01" as the sequential number character string 209, inputs "CC1-" as the first non-sequential number character string 211, and inputs "-sub" as the second non-sequential number character string 213, as in the third embodiment Furthermore, the paragraph change symbol 219 is input to the first non-sequential number character string input screen D3, and the line feed symbol 217 is input to the second non-sequential number character string input screen D4. As a result, on the text screen D1, "CC" is displayed in the first line of each of the odd-numbered paragraphs, "1-AB01" is displayed in the first line of each of the even-numbered paragraphs, and "-sub" is displayed in the second line of each of the even-numbered paragraphs.

Subsequently, the user sets character decoration for each of the paragraphs on the text screen D1. That is, the user sets the character decoration for each of the even-numbered paragraphs in a state where the cursor 203 is present at the front of "-sub". It may take time and effort to set the character decoration for each of the paragraphs, and there is a possibility that the character decoration may be incorrectly set.

On the other hand, in the present embodiment, the controller 27 receives the setting of the character decoration. Therefore, in order to create the label L illustrated in FIG. 20, the user may set the character decoration for "sub" on the second non-sequential number character string input screen D4. That is, the user does not need to set the character decoration for each of the paragraphs on the text screen D1. Therefore, it is possible to save time and effort to set the character decoration for each of the paragraphs, and it is possible to prevent the character decoration from being incorrectly set.

In the present embodiment, "sub" is set as the effective range of the character decoration on the second non-sequential number character string input screen D4, but the effective range of the character decoration may be set according to another setting method. For example, when the effective range of the character decoration is set, "from this character", "from the head of this line", and "from the head of this item" may be selected on a selection screen. When "from this character" is selected, the effective range of the character decoration is from a certain character present immediately at the rear of the decoration symbol 225 inserted to a character present at the rear of the certain character. When "from the head of this line" is selected, the decoration symbol 225 is inserted immediately at the rear of the line feed symbol 217 immediately at the front of the cursor 203, so that the entire line serves as the effective range of the character decoration regardless of the position of the cursor 203. When "from the head of this item" is selected, the decoration symbol 225 is inserted to the head of the inputted character string, so that the effective range of the character decoration is set to the whole of an item input at present.

Fifth Embodiment

Figure 21:
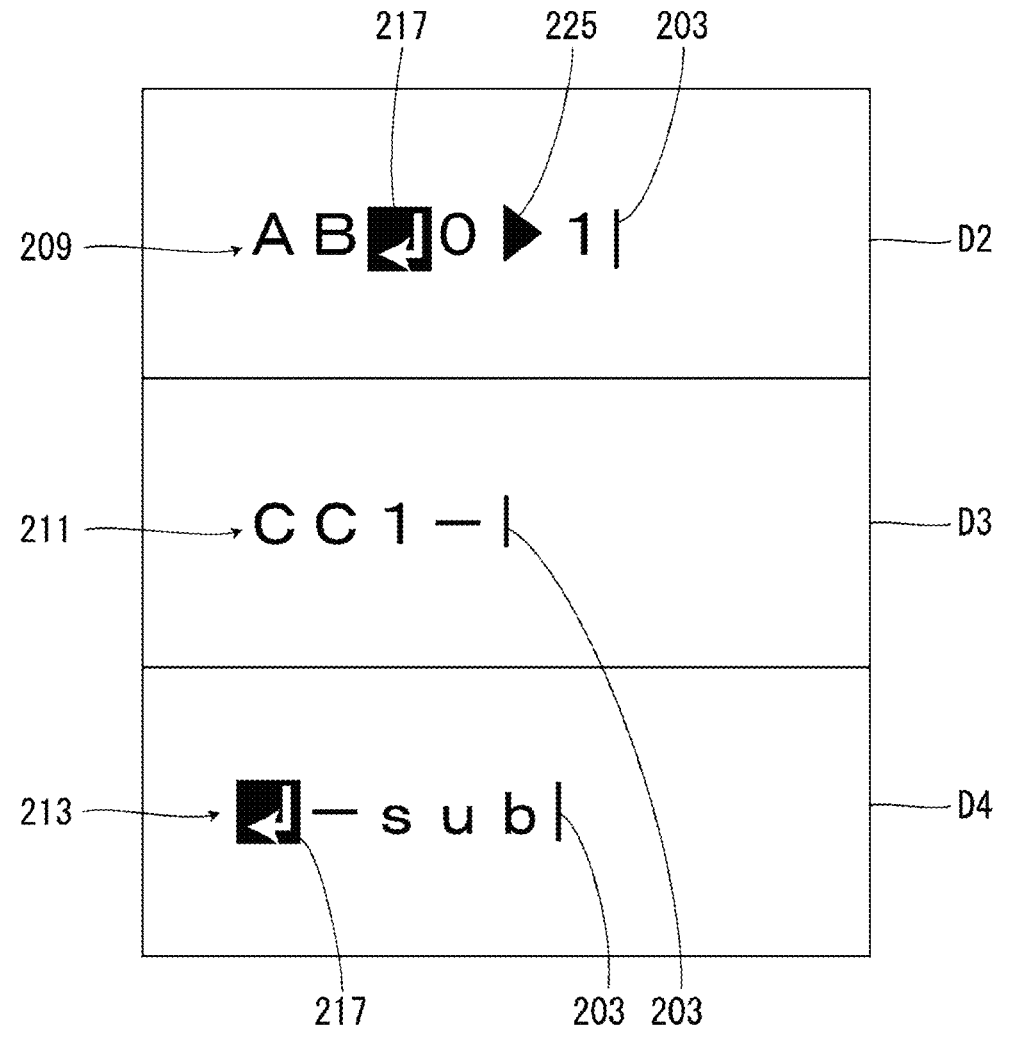
FIG. 21 is a diagram illustrating a sequential number character string input screen, a first non-sequential number number character string input screen according to a fifth embodiment.
Figure 22:
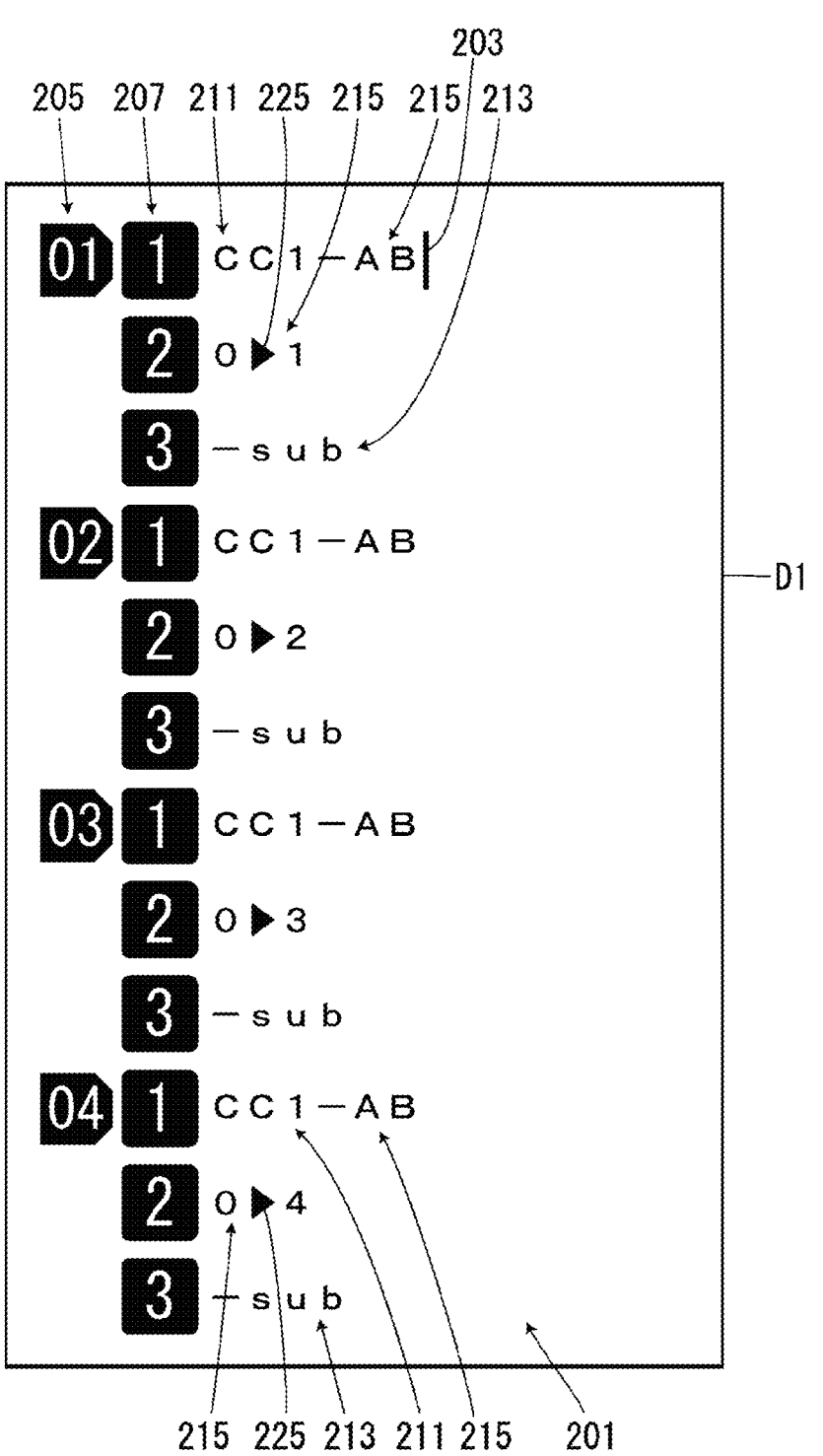
FIG. 22 is a diagram illustrating a text screen according to the fifth embodiment.
Figure 23:
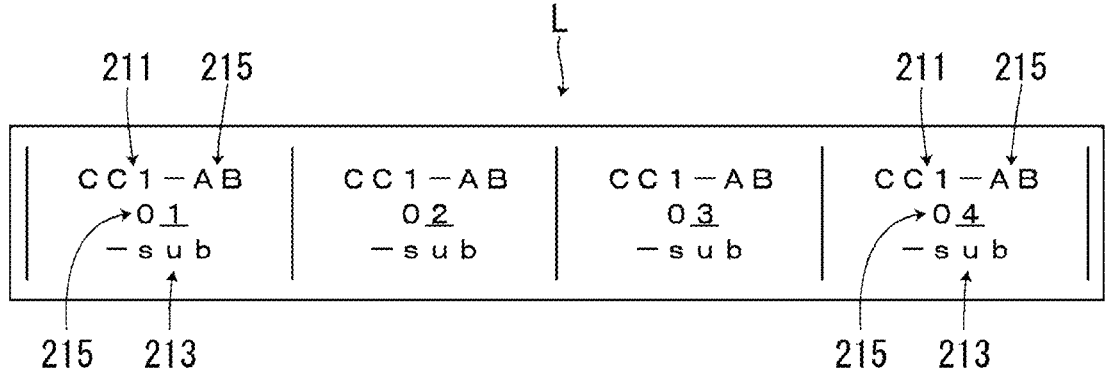
FIG. 23 is a diagram illustrating a label according to the fifth embodiment.

The fifth embodiment will be described with reference to FIGS. 21 to 23. The fifth embodiment is different from the second embodiment in that the line feed symbol 217 is input between "AB" and "01" on the sequential number character string input screen D2, and the character decoration "underline" is set for "1" of "AB01". As in the second embodiment, the line feed symbol 217 is input to the second non-sequential number character string input screen D4.

In this case, on the text screen D1, in each of the plurality of paragraphs, the sequential number update character string 215, the first non-sequential number character string 211, and the second non-sequential number character string 213 are displayed in a state where a line feed is performed at the position of the line feed symbol 217, that is, in each of the paragraphs, "CC1-AB" is displayed in the first line, "On" is displayed in the second line, and "-sub" is displayed in the third line. In each of the plurality of paragraphs, the decoration symbol 225 is displayed in accordance with the setting of the character decoration. That is, the decoration symbol 225 is displayed between "0" and "n" in the second line of each of the paragraphs. When the print key 37 is operated in this state, a label L illustrated in FIG. 23 is created.

As described above, the tape printing apparatus 1 according to the present embodiment includes the display section 5 and the controller 27. The controller 27 controls the display section 5 such that the text screen D1, the sequential number character string input screen D2, the first non-sequential number character string input screen D3, and the second non-sequential number character string input screen D4 are displayed. On the text screen D1, the text 201 to be printed is edited. The controller 27 receives an input of the sequential number character string 209 in a state where the sequential number character string input screen D2 is displayed. The controller 27 receives an input of the first non-sequential number character string 211 in a state where the first non-sequential number character string input screen D3 is displayed, and receives an input of the second non-sequential number character string 213 in a state where the second non-sequential number character string input screen D4 is displayed. The controller 27 controls the display section 5 such that the sequential number update character string 215 obtained by updating the sequential number character string 209, the first non-sequential number character string 211, and the second non-sequential number character string 213 are displayed in each of the plurality of paragraphs provided on the text screen D1.

According to this configuration, the user only needs to input the first non-sequential number character string 211 and the second non-sequential number character string 213 on the first non-sequential number character string input screen D3 and the second non-sequential number character string input screen D4, respectively, and does not need to input the first non-sequential number character string 211 and the second non-sequential number character string 213 for each of the paragraphs on the text screen D1. Therefore, it is possible to save time and effort to input the first non-sequential number character string 211 and the second non-sequential number character string 213 for each of the paragraphs, and it is possible to prevent an input operation from being incorrectly performed.

First Modification

The controller 27 may be configured to be capable of receiving a plurality of inputs for setting the character decoration and to be capable of designating two or more types of character decorations. Furthermore, a character decoration may be selectively designated for a character string 1 by inputting "# (decorated) character string 1, # (undecorated) character string 2". It is to be noted that "#" is described instead of the decoration symbol 225 due to a notation restriction that prevents the decoration symbol 225, i.e., the right-pointing black triangle symbol illustrated in FIG. 18, from being written here, and the decoration symbol 225 is actually input.

Second Modification

The controller 27 may receive the setting of the character decoration in any one of an entire text, a paragraph unit, a line unit included in a paragraph, and a character unit constituting the text 201.

Third Modification

Instead of providing dedicated keys such as the line feed mark insertion key 31 and the paragraph change key 33, for example, the shift key 42 and other existing keys may be operated at the same time to provide the same functions as those of the line feed mark insertion key 31 and the paragraph change key 33.

Other Modifications

It is needless to say that the present disclosure is not limited to the above-described embodiments, and various configurations can be adopted without departing from the scope of the present disclosure. For example, in addition to the above-described embodiments, the above-described embodiments may be modified as follows. Note that the contents described in one embodiment or modification can be similarly applied to the other embodiments or modifications as long as the contents do not contradict each other.

The editing symbol is not limited to the line feed symbol 217 or the paragraph change symbol 219. The editing symbol may be a symbol for editing at least one of the number of paragraphs and the number of lines included in each of the paragraphs on the text screen D1 when the input of the editing symbol is received. The editing symbol may include, for example, a symbol for increasing the number of lines by an arbitrary number, a symbol for increasing the number of paragraphs by an arbitrary number, and the like.

In the present embodiment, on the text screen D1, the first non-sequential number character string 211 is arranged at the front of the sequential number update character string 215, and the second non-sequential number character string 213 is arranged at the rear of the sequential number update character string 215, but the present disclosure is not limited thereto. For example, contrary to the present embodiment, the second non-sequential number character string 213 may be arranged at the front of the sequential number update character string 215, and the first non-sequential number character string 211 may be arranged at the rear of the sequential number update character string 215. The user may freely set the arrangement of the sequential number update character string 215, the first non-sequential number character string 211, and the second non-sequential number character string 213 on the text screen D1.

In the present embodiment, the input of the first non-sequential number character string 211 is received in a state where the first non-sequential number character string input screen D3 is displayed, and the input of the second non-sequential number character string 213 is received in a state where the second non-sequential number character string input screen D4 is displayed, but the present disclosure is not limited thereto. For example, the input of the first non-sequential number character string 211 and the input of the second non-sequential number character string 213 may be received on a single screen. That is, two different screens may function as the "non-sequential number character string input screen" as in the present embodiment, or a single screen may function as the "non-sequential number character string input screen" unlike the present embodiment. Furthermore, the input of the sequential number character string 209 may be received in addition to the input of the first non-sequential number character string 211 and the input of the second non-sequential number character string 213 on a single screen. That is, the single screen may function as the "sequential number character string input screen" and the "non-sequential number character string input screen".

The techniques of the present embodiment are not limited to the tape printing apparatus 1, and can also be applied to an information processing apparatus that does not have a printing function. As the information processing apparatus, for example, a personal computer, a smartphone, a tablet terminal, or the like can be used. The information processing apparatus may generate print data based on a result of editing the text 201 on the text screen D1 and transmit the generated print data to the tape printing apparatus 1. Furthermore, the program stored in the storage section 45 of the tape printing apparatus 1 may be provided to the user as a program for causing the information processing apparatus to execute functions equivalent to those of the tape printing apparatus 1. In addition, the program may be provided to a customer via a communication network, and may be provided to the customer in a form stored in a storage medium.

Supplementary Notes

Hereinafter, a tape printing apparatus, a method for controlling the tape printing apparatus, an information processing apparatus, and a non-transitory computer-readable storage medium storing a program will be additionally described.

A tape printing apparatus includes a display section and a controller that controls the display section such that a text screen on which a text to be printed is edited, a sequential number character string input screen, and a non-sequential number character string input screen are displayed. The controller receives an input of a sequential number character string in a state where the sequential number character string input screen is displayed. The controller receives an input of a first non-sequential number character string and an input of a second non-sequential number character string in a state where the non-sequential number character string input screen is displayed. The controller controls the display section such that a sequential number update character string obtained by updating the sequential number character string, the first non-sequential number character string, and the second non-sequential number character string are displayed in each of a plurality of paragraphs provided on the text screen.

According to this configuration, the user only needs to input the first non-sequential number character string and the second non-sequential number character string on the non-sequential number character string input screen, and does not need to input the first non-sequential number character string and the second non-sequential number character string for each of the paragraphs on the text screen. Therefore, it is possible to save time and effort to input the first non-sequential number character string and the second non-sequential number character string for each of the paragraphs, and it is possible to prevent an input operation from being incorrectly performed.

Note that the first non-sequential number character string input screen D3 and the second non-sequential number character string input screen D4 are examples of the non-sequential number character string input screen.

In this case, it is preferable that the controller receive an input of the decoration symbol in a state where the non-sequential number character string input screen is displayed, and that the controller control the display section such that at least one of the number of the plurality of paragraphs and the number of lines included in each of the paragraphs is edited on the text screen when the controller receives the input of the decoration symbol.

According to this configuration, the user only needs to input the decoration symbol on the non-sequential number character string input screen, and does not need to perform an operation of editing the number of paragraphs or the number of lines for each of the paragraphs on the text screen. Therefore, it is possible to save time and effort to perform an operation of editing the number of paragraphs or the number of lines for each of the paragraphs, and it is possible to prevent an editing operation from being incorrectly performed.

In this case, it is preferable that the controller receive an input of the line feed symbol as the decoration symbol, and that the controller control the display section such that the sequential number update character string, the first non-sequential number character string, and the second non-sequential number character string are displayed in a state where a line feed is performed at a position of the line feed symbol in each of the plurality of paragraphs on the text screen when the controller receives the input of the line feed symbol.

According to this configuration, the user only needs to input the line feed symbol on the non-sequential number character string input screen, and does not need to perform a line feed operation for each of the paragraphs on the text screen. Therefore, it is possible to save time and effort to perform the line feed operation for each of the paragraphs, and it is possible to prevent the line feed operation from being incorrectly performed.

In this case, it is preferable that the controller receive an input of the paragraph change symbol as the decoration symbol, and that the controller control the display section such that the sequential number update character string, the first non-sequential number character string, and the second non-sequential number character string are displayed in each of the plurality of paragraphs on the text screen in a state where a paragraph change is performed at the position of the paragraph change symbol when the controller receives the input of the paragraph change symbol.

According to this configuration, the user only needs to input the paragraph change symbol on the non-sequential number character string input screen, and does not need to perform the paragraph change operation for each of the paragraphs on the text screen. Therefore, it is possible to save time and effort to perform the paragraph change operation for each of the paragraphs, and it is possible to prevent the paragraph change operation from being incorrectly performed.

In this case, it is preferable that the controller receive setting of character decoration for at least one of the first non-sequential number character string and the second non-sequential number character string in a state where the non-sequential number character string input screen is displayed, and that the controller control the display section such that the decoration symbol indicating that character decoration has been set for at least one of the first non-sequential number character string and the second non-sequential number character string is displayed in each of the plurality of paragraphs on the text screen when the controller receives the setting of the character decoration.

According to this configuration, the user only needs to set the character decoration on the non-sequential number character string input screen, and does not need to set the character decoration for each of the paragraphs on the text screen. Therefore, it is possible to save time and effort to set the character decoration for each of the paragraphs, and it is possible to prevent incorrect setting of the character decoration.

In this case, it is preferable that the controller generate print data based on a result of editing the text on the text screen.

According to this configuration, it is possible to generate print data based on a result of editing the text by a simple operation.

In this case, it is preferable that the controller receive an input of the decoration symbol in a state where the sequential number character string input screen is displayed, and that the controller control the display section such that at least one of the number of the plurality of paragraphs and the number of lines included in each of the paragraphs is edited on the text screen when the controller receives the input of the decoration symbol.

According to this configuration, the user only needs to input the decoration symbol on the sequential number character string input screen, and does not need to perform an operation of editing the number of paragraphs or the number of lines for each of the paragraphs on the text screen. Therefore, it is possible to save time and effort to perform an operation of editing the number of paragraphs or the number of lines for each of the paragraphs, and it is possible to prevent an editing operation from being incorrectly performed.

In this case, it is preferable that the controller receive setting of character decoration for the sequential number character string in a state where the sequential number character string input screen is displayed, and that the controller control the display section such that the decoration symbol indicating that the character decoration has been set for the sequential number update character string is displayed in each of the plurality of paragraphs on the text screen when the controller receives the setting of the character decoration.

According to this configuration, the user only needs to set the character decoration on the sequential number character string input screen, and does not need to set the character decoration for each of the paragraphs on the text screen. Therefore, it is possible to save time and effort to set the character decoration for each of the paragraphs, and it is possible to prevent incorrect setting of the character decoration.

A method for controlling a tape printing apparatus including a display section includes: receiving an input of a sequential number character string in a state where a sequential number character string input screen is displayed on the display section; receiving an input of a first non-sequential number character string and an input of a second non-sequential number character string in a state where a non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided on a text screen displayed on the display section.

According to this configuration, the user only needs to input the first non-sequential number character string and the second non-sequential number character string on the non-sequential number character string input screen, and does not need to input the first non-sequential number character string and the second non-sequential number character string for each of the paragraphs on the text screen. Therefore, it is possible to save time and effort to input the first non-sequential number character string and the second non-sequential number character string for each of the paragraphs, and it is possible to prevent the input operation from being incorrectly performed.

An information processing apparatus includes a display section and a controller that controls the display section such that a text screen on which a text to be printed is edited, a sequential number character string input screen, and a non-sequential number character string input screen are displayed. The controller receives an input of a sequential number character string in a state where the sequential number character string input screen is displayed, and receives an input of a first non-sequential number character string and an input of a second non-sequential number character string in a state where the non-sequential number character string input screen is displayed. The controller controls the display section such that a sequential number update character string obtained by updating the sequential number character string, the first non-sequential number character string, and the second non-sequential number character string are displayed in each of a plurality of paragraphs provided on the text screen displayed on the display section.

According to this configuration, the user only needs to input the first non-sequential number character string and the second non-sequential number character string on the non-sequential number character string input screen, and does not need to input the first non-sequential number character string and the second non-sequential number character string for each of the paragraphs on the text screen. Therefore, it is possible to save time and effort to input the first non-sequential number character string and the second non-sequential number character string for each of the paragraphs, and it is possible to prevent the input operation from being incorrectly performed.

A non-transitory computer-readable storage medium stores a program for causing an information processing apparatus to execute functions of: controlling a display section included in the information processing apparatus such that a text screen on which a text to be printed is edited, a sequential number character string input screen, and a non-sequential number character string input screen are displayed; receiving an input of a sequential number character string in a state where the sequential number character string input screen is displayed on the display section; receiving an input of a first non-sequential number character string and an input of a second non-sequential number character string in a state where the non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided on the text screen.

According to this configuration, the user only needs to input the first non-sequential number character string and the second non-sequential number character string on the non-sequential number character string input screen, and does not need to input the first non-sequential number character string and the second non-sequential number character string for each of the paragraphs on the text screen. Therefore, it is possible to save time and effort to input the first non-sequential number character string and the second non-sequential number character string for each of the paragraphs, and it is possible to prevent the input operation from being incorrectly performed.

What is claimed is:

1. A tape printing apparatus comprising
a display section; and
a controller that controls the display section such that a text screen on which text to be printed is edited, a sequential number character string input screen, and a non-sequential number character string input screen are displayed, wherein the controller receives an input of a sequential number character string in a state where the sequential number character string input screen is displayed, the controller receives an input of a first non-sequential number character string and an input of a second non-sequential number character string in a state where the non-sequential number character string input screen is displayed, and the controller controls the display section such that a sequential number update character string obtained by updating the sequential number character string, the first non-sequential number character string, and the second non-sequential number character string are displayed in each of a plurality of paragraphs provided on the text screen.

2. The tape printing apparatus according to claim 1, wherein
the controller receives an input of an editing symbol in a state where the non-sequential number character string input screen is displayed, and
the controller controls the display section such that at least one of the number of the plurality of paragraphs and the number of lines included in each of the paragraphs is edited on the text screen when the controller receives the input of the editing symbol.

3. The tape printing apparatus according to claim 2, wherein
the controller receives an input of a line feed symbol as the editing symbol, and
the controller controls the display section such that the sequential number update character string, the first non-sequential number character string, and the second non-sequential number character string are displayed in each of the plurality of paragraphs on the text screen in a state where a line feed is performed at a position of the line feed symbol when the controller receives the input of the line feed symbol.

4. The tape printing apparatus according to claim 2, wherein
the controller receives an input of a paragraph change symbol as the editing symbol, and
the controller controls the display section such that the sequential number update character string, the first non-sequential number character string, and the second non-sequential number character string are displayed in each of the plurality of paragraphs on the text screen in a state where a paragraph change is performed at the position of the paragraph change symbol when the controller receives the input of the paragraph change symbol.

5. The tape printing apparatus according to claim 1, wherein
the controller receives setting of character decoration for at least one of the first non-sequential number character string and the second non-sequential number character string in a state where the non-sequential number character string input screen is displayed, and
the controller controls the display section such that a decoration symbol indicating that the character decoration has been set for at least one of the first non-sequential number character string and the second non-sequential number character string is displayed in each of the plurality of paragraphs on the text screen when the controller receives the setting of the character decoration.

6. The tape printing apparatus according to claim 1, wherein the controller generates print data based on a result of editing the text on the text screen.

7. The tape printing apparatus according to claim 1, wherein the controller receives an input of a decoration symbol in a state where the sequential number character string input screen is displayed, and the controller controls the display section such that at least one of the number of the plurality of paragraphs and the number of lines included in each of the paragraphs is edited on the text screen when the controller receives the input of the decoration symbol.

8. The tape printing apparatus according to claim 1, wherein the controller receives setting of character decoration for the sequential number character string in a state where the sequential number character string input screen is displayed, and the controller controls the display section such that a decoration symbol indicating that the character decoration has been set for the sequential number update character string is displayed in each of the plurality of paragraphs on the text screen when the controller receives the setting of the character decoration.

9. A method for controlling a tape printing apparatus including a display section, the method comprising;

receiving an input of a sequential number character string in a state where a sequential number character string input screen is displayed on the display section;

receiving an input of a first non-sequential number character string and an input of a second non-sequential number character string in a state where a non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided on a text screen displayed on the display section.

10. An information processing apparatus comprising:

a display section; and a controller that controls the display section such that a text screen on which a text to be printed is edited, a sequential number character string input screen, and a non-sequential number character string input screen are displayed, wherein the controller receives an input of a sequential number character string in a state where the sequential number character string input screen is displayed, the controller receives an input of a first non-sequential number character string and an input of a second non-sequential number character string in a state where the non-sequential number character string input screen is displayed, and the controller controls the display section such that a sequential number update character string obtained by updating the sequential number character string, the first non-sequential number character string, and the second non-sequential number character string are displayed in each of a plurality of paragraphs provided on the text screen.

11. A non-transitory computer-readable storage medium storing a program for causing an information processing apparatus to execute functions of:

controlling a display section included in the information processing apparatus such that a text screen on which a text to be printed is edited, a sequential number character string input screen, and a non-sequential number character string input screen are displayed;

receiving an input of a sequential number character string in a state where the sequential number character string input screen is displayed on the display section;

receiving an input of a first non-sequential number character string and an input of a second non-sequential number character string in a state where the non-sequential number character string input screen is displayed on the display section; and controlling the display section such that a sequential number update character string obtained by updating the sequential number character string, the first non-sequential number character string, and the second non-sequential number character string are displayed in each of a plurality of paragraphs provided on the text screen.

* * * * *